United States Patent
Saito et al.

(10) Patent No.: US 9,147,230 B2
(45) Date of Patent: Sep. 29, 2015

(54) IMAGE PROCESSING DEVICE, IMAGE PROCESSING METHOD, AND PROGRAM TO PERFORM CORRECTION PROCESSING ON A FALSE COLOR

(71) Applicant: Sony Corporation, Tokyo (JP)

(72) Inventors: Yasushi Saito, Saitama (JP); Satoru Takeuchi, Chiba (JP); Fumihito Yasuma, Tokyo (JP)

(73) Assignee: Sony Corporation, Tokyo (JP)

( * ) Notice: Subject to any disclaimer, the term of this patent is extended or adjusted under 35 U.S.C. 154(b) by 243 days.

(21) Appl. No.: 13/857,246

(22) Filed: Apr. 5, 2013

(65) Prior Publication Data

US 2013/0272605 A1    Oct. 17, 2013

(30) Foreign Application Priority Data

Apr. 12, 2012 (JP) ................. 2012-090748

(51) Int. Cl.
  *G06K 9/00* (2006.01)
  *G06K 9/40* (2006.01)
  *G06T 5/00* (2006.01)
  (Continued)

(52) U.S. Cl.
  CPC ............... *G06T 5/002* (2013.01); *G06T 3/4015* (2013.01); *H04N 9/045* (2013.01); *H04N 9/646* (2013.01); *G06T 2207/10024* (2013.01)

(58) Field of Classification Search
  CPC ........ G06T 5/002; G06T 5/003; H04N 9/045; H04N 9/646
  USPC ......................................... 382/162, 167, 275
  See application file for complete search history.

(56) References Cited

U.S. PATENT DOCUMENTS 5,995,669 A * 11/1999 Shingu et al. ................. 382/162
2004/0218071 A1* 11/2004 Chauville et al. ............. 348/262
(Continued)

FOREIGN PATENT DOCUMENTS

JP    2006-014261 A    1/2006
JP    2009-124598 A    6/2009
(Continued)

OTHER PUBLICATIONS

Signh et al. ("Joint chromatic aberration correction and demosaicking," SPIE vol. 8299, Jan. 24, 2012).*
(Continued)

*Primary Examiner* — Yubin Hung
(74) *Attorney, Agent, or Firm* — Sony Corporation

(57) ABSTRACT

Provided is an image processing device including a data conversion processing unit that receives an input of an RGBW array image and generates an RGB array image as an output image. The data conversion processing unit includes a pixel interpolation unit that calculates interpolated pixel values corresponding to an array of the RGB array image by performing a pixel interpolation process on the RGBW array image, a purple fringe detection unit that detects whether each pixel is a purple fringe pixel by analyzing the RGBW array image, a corrected value calculation unit that calculates corrected pixel values by correcting pixel values of the purple fringe pixels, and a blend processing unit that calculates constituent pixel values RGB of the output image by performing a blend process of blending the interpolated pixel values calculated by the pixel interpolation unit with the corrected pixel values calculated by the corrected value calculation unit.

19 Claims, 16 Drawing Sheets

(51) Int. Cl.
*H04N 9/04* (2006.01)
*H04N 9/64* (2006.01)
*G06T 3/40* (2006.01)

(56) References Cited

U.S. PATENT DOCUMENTS

| | | | | |
|---|---|---|---|---|
| 2007/0103564 | A1* | 5/2007 | Chiba | 348/223.1 |
| 2007/0153341 | A1* | 7/2007 | Kang | 358/529 |
| 2008/0170248 | A1* | 7/2008 | Kang et al. | 358/1.9 |
| 2008/0218597 | A1* | 9/2008 | Cho | 348/222.1 |
| 2010/0027886 | A1* | 2/2010 | Kang et al. | 382/167 |
| 2010/0166305 | A1* | 7/2010 | Song et al. | 382/167 |
| 2011/0050918 | A1* | 3/2011 | Tachi | 348/208.4 |
| 2011/0148910 | A1* | 6/2011 | Botzas et al. | 345/600 |
| 2012/0044369 | A1* | 2/2012 | Irisawa et al. | 348/208.4 |
| 2012/0082380 | A1* | 4/2012 | Fujiwara et al. | 382/167 |
| 2013/0242152 | A1* | 9/2013 | Kasai | 348/294 |
| 2013/0278726 | A1* | 10/2013 | Muhammad et al. | 348/46 |

FOREIGN PATENT DOCUMENTS

| | | |
|---|---|---|
| JP | 2010-136225 A | 6/2010 |
| JP | 2011-182354 A | 9/2011 |

OTHER PUBLICATIONS

Singh et al. ("Linear universal demosaicking of regular pattern color filter arrays," ICASSP, Mar. 25-30, 2012).*

* cited by examiner

FIG. 2
(PRIOR ART)

(a) RGB ARRAY (BAYER ARRAY)

| G | R | G | R | G | R | G | R |
|---|---|---|---|---|---|---|---|
| B | G | B | G | B | G | B | G |
| G | R | G | R | G | R | G | R |
| B | G | B | G | B | G | B | G |
| G | R | G | R | G | R | G | R |
| B | G | B | G | B | G | B | G |
| G | R | G | R | G | R | G | R |
| B | G | B | G | B | G | B | G |

(b) RGBW ARRAY

| W | R | W | G | W | R | W | G |
|---|---|---|---|---|---|---|---|
| B | W | G | W | B | W | G | W |
| W | G | W | R | W | G | W | R |
| G | W | B | W | G | W | B | W |
| W | R | W | G | W | R | W | G |
| B | W | G | W | B | W | G | W |
| W | G | W | R | W | G | W | R |
| G | W | B | W | G | W | B | W |

FIG. 4

RGBW ARRAY

| W | R | W | G | W | R | W | G |
|---|---|---|---|---|---|---|---|
| B | W | G | W | B | W | G | W |
| W | G | W | R | W | G | W | R |
| G | W | B | W | G | W | B | W |
| W | R | W | G | W | R | W | G |
| B | W | G | W | B | W | G | W |
| W | G | W | R | W | G | W | R |
| G | W | B | W | G | W | B | W |

FIG. 14

(a) G PIXEL (b) RGB PIXELS

CENTRAL PIXEL

CENTRAL PIXEL

IMAGE PROCESSING DEVICE, IMAGE PROCESSING METHOD, AND PROGRAM TO PERFORM CORRECTION PROCESSING ON A FALSE COLOR

BACKGROUND

The present disclosure relates to an image processing device, an image processing method, and a program, and more particularly, to an image processing device, an image processing method, and a program capable of performing a correction process on a false color or the like produced in an image photographed by a camera.

In an image photographed by a camera, a problem of aberration of a photographing lens occurs in some cases. Specifically, for example, chromatic aberration is one aberration caused due to the influence of lens aberration. Chromatic aberration occurs when a refractive index of light in a photographing lens of a camera differs depending on a wavelength, and causes a false color on an imaging surface.

As representative examples of the chromatic aberration, for example, axial chromatic aberration in which color blur occurs because a focal position on an optical axis differs depending on a wavelength and magnification chromatic aberration in which color deviation occurs because an image high-power differs due to a wavelength are known.

A false color of purple produced in the periphery of a high-contrast edge in which there is an overexposed pixel of which luminance reaches a saturated value is generally called purple fringe. This purple fringe is caused due to axial chromatic aberration or magnification chromatic aberration, and thus results in deterioration in image quality.

The color of the purple fringe is a color closer to purple in many cases. In practice, however, a color other than purple is produced in some cases due to lenses, photographing conditions, or the like. Here, a false color produced in the periphery of an overexposed high-contrast edge is referred to as purple fringe, irrespective of a color of the false color.

An occurrence cause and an occurrence region of the purple fringe will be described with reference to FIGS. 1(a) and 1(b).

FIG. 1(a) is a graph in which the horizontal axis represents a pixel position and the vertical axis represents a pixel value.

FIG. 1(b) is a schematic diagram illustrating a photographed image.

A Bayer array frequently used as a pixel array of an image sensor of a general camera includes pixels with three colors of red (R), green (G), and blue (B).

In FIG. 1(a), a region of pixel positions 0 to X1 is a so-called overexposed region in which the pixel value is the maximum. The pixel position X1 corresponds to an edge position at which the luminance value is sharply changed. A region of the pixel position X1 to a position subsequent to the pixel position X1 is a region in which the original pixel value is set to nearly 0.

Thus, a false color is produced since there is a difference between the pixel values of RGB due to chromatic aberration in the vicinity of the overexposed region in the periphery of the edge in which a pixel value is sharply changed from the overexposed region with the maximum pixel value.

In order to reduce the chromatic aberration, it is ideal to use a lens made of special material glass such as fluorite in which chromatic aberration hardly occurs. However, there is a disadvantage that a manufacturing cost is high.

Methods of reducing a false color produced due to such chromatic aberration by image processing are disclosed in, for example, Japanese Unexamined Patent Application Publication No. 2009-124598 and Japanese Unexamined Patent Application Publication No. 2006-14261.

In processes disclosed in Japanese Unexamined Patent Application Publication No. 2009-124598 and Japanese Unexamined Patent Application Publication No. 2006-14261, however, a false color is detected and corrected using an RGB image after a de-mosaic process of setting all pixel values of RGB in respective pixels is performed through signal processing such as pixel value interpolation on a mosaic image in which one pixel value of RGB is set in each pixel output from an image sensor.

Accordingly, the processes disclosed in Japanese Unexamined Patent Application Publication No. 2009-124598 and Japanese Unexamined Patent Application Publication No. 2006-14261 may not be applied as processes on a mosaic image immediately output from the image sensor, that is, a mosaic image in which one pixel value of RGB is set in each pixel.

Further, Japanese Unexamined Patent Application Publication No. 2010-136225 discloses a process of removing a false color through image processing on a mosaic image before a de-mosaic process.

However, the disclosed process is merely a process performed on a Bayer-array image with a pixel array shown in FIG. 2(a) frequently used in cameras according to the related art.

On the other hand, in recent years, a problem has arisen in that the pixel density of image sensor has increased, the amount of incident light per pixel has decreased, and thus relative noise has increased. As a method of resolving this problem, an image sensor that has an RGBW array including all-wavelength transmission type white (W) pixels in addition to RGB colors has been suggested.

Specifically, an image sensor that has an RGBW array including white (W) pixels is shown in FIG. 2(b). A mosaic image which is an image photographed by an image sensor having the RGBW array and output from the image sensor is configured as a mosaic image in which only a pixel value of one color of RGBW is set in each pixel according to the pixel array shown in FIG. 2(b).

A technology for reducing purple fringe in a mosaic image photographed by an image sensor that has such an RGBW array has not been disclosed in the related art. Further, there is a problem that correction processes on an RGB array previously disclosed in the related art may not be directly applied.

SUMMARY

It is desirable to provide an image processing device, an image processing method, and a program capable of outputting a high-quality image by performing a process of detecting or correcting a region in which a false color such as purple fringe is produced as a process on a mosaic image, which is an output image of an image sensor before de-mosaic.

It is also desirable to provide an image processing device, an image processing method, and a program capable of outputting a high-quality image by detecting and correcting a region in which a false color such as purple fringe is produced from a mosaic image that has an array including white pixels.

According to a first embodiment of the present disclosure, there is provided an image processing device including a data conversion processing unit that receives an input of an RGBW array image and generates an RGB array image as an output image. The data conversion processing unit may include a pixel interpolation unit that calculates interpolated pixel values r1, g1, and b1 corresponding to an array of the RGB array image by performing a pixel interpolation process on the RGBW array image, a purple fringe detection unit that detects whether each pixel is a purple fringe pixel by analyzing the RGBW array image, a corrected value calculation unit that calculates corrected pixel values r2, g2, and b2 by correcting pixel values of the purple fringe pixels, and a blend processing unit that calculates constituent pixel values RGB of the output image by performing a blend process of blending the interpolated pixel values r1, g1, and b1 calculated by the pixel interpolation unit with the corrected pixel values r2, g2, and b2 calculated by the corrected value calculation unit.

Further, according to the first embodiment, the purple fringe detection unit may calculate a W pixel dynamic range Wd from a W pixel value of a reference region which is set in the RGBW array image and includes a pixel of interest which is a calculation target pixel of the constituent pixel value of the output image, and perform initial determination of determining that there is a high possibility that the pixel of interest is the purple fringe pixel when the W pixel dynamic range Wd is greater than a threshold value ThrW.

Further, according to the first embodiment, when the purple fringe detection unit determines that there is the high possibility that the pixel of interest is the purple fringe pixel in the initial determination, the purple fringe detection unit may verify whether there is a saturated pixel in RGB pixels or RGBW pixels in the reference region and perform final determination of determining that the pixel of interest is the purple fringe pixel when there is the saturated pixel.

Further, according to the first embodiment, the corrected value calculation unit may calculate a lowpass signal of a luminance signal main component from a pixel value of a color pixel serving as the luminance signal main component of a reference region which is set within the RGBW array image and includes a pixel of interest which is a calculation target pixel of a constituent pixel value of the output image, and calculate the corrected pixel value by performing white balance adjustment on the calculated lowpass signal of the luminance signal main component according to a color after a conversion target pixel of the pixel of interest.

Further, according to the first embodiment, the color pixel serving as the luminance signal main component may be a W pixel or a G pixel.

Further, according to the first embodiment, the blend processing unit may calculate a blend rate according to a W pixel dynamic range Wd calculated from a W pixel value of a reference region which is set within the RGBW array image and includes a pixel of interest which is a calculation target pixel of a constituent pixel value of the output image, and perform the blend process according to the calculated blend rate.

Further, according to the first embodiment, as a W pixel dynamic range Wd of the reference region is larger, the blend processing unit may perform the blend process by setting a contribution ratio of the corrected pixel values r2, g2, and b2 calculated by the corrected value calculation unit to be larger than a contribution ratio of the interpolated pixel values r1, g1, and b1 calculated by the pixel interpolation unit, and calculate the constituent pixel values RGB of the output image.

Further, according to the first embodiment, the blend processing unit may calculate a blend rate rate of the corrected pixel values r2, g2, and b2 calculated by the corrected value calculation unit by applying a W pixel dynamic range Wd of the reference region and a maximum value MAX of the W pixel dynamic range Wd according to the following expression:

$$\text{rate} = Wd/\text{MAX}.$$

Further, according to the first embodiment, the blend processing unit may perform the blend process on the pixel determined to be the purple fringe by the purple fringe detection unit by setting a blend rate of the corrected pixel values r2, g2, and b2 calculated by the corrected value calculation unit to 1.0 and output the corrected pixel values r2, g2, and b2 as the constituent pixel values RGB of the output image.

Further, according to a second embodiment of the present disclosure, there is provided an image processing device including a data correction processing unit that receives an input of an RGB array image as an input image and generates a corrected image by performing a pixel value correction process. The data correction processing unit may include a purple fringe detection unit that analyzes the input image to detect whether each pixel is a purple fringe pixel, a corrected value calculation unit that calculates corrected pixel values r2, g2, and b2 by performing pixel value correction on the purple fringe pixel, and a blend processing unit that calculates constituent pixel values RGB of the corrected image by performing a blend process of blending pixel values r1, g1, and b1 of the input image with the corrected pixel values r2, g2, and b2 calculated by the corrected value calculation unit.

Further, according to the second embodiment, the purple fringe detection unit may calculate a G pixel dynamic range Gd from a G pixel value of a reference region which is set within the input image and includes a pixel of interest which is a calculation target pixel of the constituent pixel value of the corrected image, and perform initial determination of determining that there is a high possibility that the pixel of interest is the purple fringe pixel when the G pixel dynamic range Gd is greater than a threshold value ThrG.

Further, according to the second embodiment, when the purple fringe detection unit determines that there is the high possibility that the pixel of interest is the purple fringe pixel in the initial determination, the purple fringe detection unit may verify whether there is a saturated pixel in RGB pixels in the reference region and perform final determination of determining that the pixel of interest is the purple fringe pixel when there is the saturated pixel.

Further, according to the second embodiment, the corrected value calculation unit may calculate a G lowpass signal from a pixel value of the G pixel of a reference region which is set within the input image and includes a pixel of interest which is a calculation target pixel of a constituent pixel value of the corrected image, and calculate the corrected pixel value by performing white balance adjustment on the calculated G lowpass signal according to a color after a conversion target pixel of the pixel of interest.

Further, according to the second embodiment, the blend processing unit may calculate a blend rate according to a G pixel dynamic range Gd calculated from a G pixel value of a reference region which is set within the input image and includes a pixel of interest which is a calculation target pixel of a constituent pixel value of the corrected image, and perform the blend process according to the calculated blend rate.

Further, according to the second embodiment, as a G pixel dynamic range Gd of the reference region is larger, the blend processing unit may perform the blend process by setting a contribution ratio of the corrected pixel values r2, g2, and b2 calculated by the corrected value calculation unit to be larger than a contribution ratio of the pixel values r1, g1, and b1 of the input image, and calculate the constituent pixel values RGB of the corrected image.

Further, according to the second embodiment, the blend processing unit may calculate a blend rate rate of the corrected pixel values r2, g2, and b2 calculated by the corrected value calculation unit by applying a G pixel dynamic range Gd of the reference region and a maximum value MAX of the G pixel dynamic range Gd according to the following expression:

rate=Gd/MAX.

Further, according to a third embodiment of the present disclosure, there is provided an image processing method performed by an image processing device, the method including performing, by a data conversion processing unit, a data conversion process of receiving an input of an RGBW array image and generating an RGB array image as an output image. The data conversion process may include calculating interpolated pixel values r1, g1, and b1 corresponding to an array of the RGB array image by performing a pixel interpolation process on the RGBW array image, detecting whether each pixel is a purple fringe pixel by analyzing the RGBW array image, calculating corrected pixel values r2, g2, and b2 by correcting pixel values of the purple fringe pixels, and calculating constituent pixel values RGB of the output image by performing a blend process of blending the interpolated pixel values r1, g1, and b1 calculated in the process of calculating interpolated pixel values with the corrected pixel values r2, g2, and b2 calculated in the process of calculating the corrected values.

Further, according to the third embodiment, the process of detecting the purple fringe may include calculating a W pixel dynamic range Wd from a W pixel value of a reference region which is set in the RGBW array image and includes a pixel of interest which is a calculation target pixel of the constituent pixel value of the output image, and performing initial determination of determining that there is a high possibility that the pixel of interest is the purple fringe pixel when the W pixel dynamic range Wd is greater than a threshold value ThrW.

Further, according to a fourth embodiment of the present disclosure, there is provided a program for causing an image processing device to perform image processing, the program causing a data conversion processing unit to perform a data conversion process of receiving an input of an RGBW array image and generating an RGB array image as an output image. In the data conversion process, the program may cause the following processes to be performed, calculating interpolated pixel values r1, g1, and b1 corresponding to an array of the RGB array image by performing a pixel interpolation process on the RGBW array image, detecting whether each pixel is a purple fringe pixel by analyzing the RGBW array image, calculating corrected pixel values r2, g2, and b2 by correcting pixel values of the purple fringe pixels, and calculating constituent pixel values RGB of the output image by performing a blend process of blending the interpolated pixel values r1, g1, and b1 calculated in the process of calculating interpolated pixel values with the corrected pixel values r2, g2, and b2 calculated in the process of calculating the corrected values.

Further, according to the fourth embodiment, in the process of detecting the purple fringe, the program may cause the following processes to be performed, calculating a W pixel dynamic range Wd from a W pixel value of a reference region which is set in the RGBW array image and includes a pixel of interest which is a calculation target pixel of the constituent pixel value of the output image, and performing initial determination of determining that there is a high possibility that the pixel of interest is the purple fringe pixel when the W pixel dynamic range Wd is greater than a threshold value ThrW.

Note that the program according to the present disclosure is a program that can be provided in a storage medium or communication medium that is provided in a computer-readable form for an information processing device or a computer system that is capable of executing various types of program code, for example. Providing this sort of program in a computer-readable form makes it possible to implement the processing according to the program in the information processing device or the computer system.

The purposes, features, and advantages of the present disclosure will be made clear later by a more detailed explanation that is based on the embodiments of the present disclosure and the appended drawings. Furthermore, the system in this specification is not limited to being a configuration that logically aggregates a plurality of devices, all of which are contained within the same housing.

According to an embodiment of the present disclosure, a device and a method for correcting purple fringe for a mosaic image output from an image sensor are realized.

Specifically, for example, there are provided a pixel interpolation unit that calculates interpolated pixel values of an RGB array image by performing a pixel interpolation process on an RGBW array image, a purple fringe detection unit that detects a purple fringe pixel from the RGBW array image, a corrected value calculation unit that calculates corrected pixel values by correcting pixel values of the purple fringe pixels, and a blend processing unit that calculates constituent pixel values RGB of an output image by blending the interpolated pixel values calculated by the pixel interpolation unit with the corrected pixel values calculated by the corrected value calculation unit. The purple fringe detection unit determines that a pixel of interest is the purple fringe pixel when a W pixel dynamic range of a reference region is greater than a previously defined threshold value and there is a saturated RGB pixel or a saturated RGBW pixel in the reference region.

By performing such processes, it is possible to realize detection of the purple fringe pixel with high accuracy for a mosaic image output from an image sensor and generate of a high-quality image in which the influence of the purple fringe is reduced.

BRIEF DESCRIPTION OF THE DRAWINGS

FIGS. 2(a) and 2(b) are diagram illustrating examples of the structures of pixel arrays of an imaging device;

FIG. 4 is a diagram illustrating a pixel array of an image sensor of the image processing device according to the embodiment of the present disclosure;

FIGS. 14(a) and 14(b) are diagrams illustrating a purple fringe correction process performed by the image processing device according to the embodiment of the present disclosure;

DETAILED DESCRIPTION OF THE EMBODIMENTS

Figure 1:
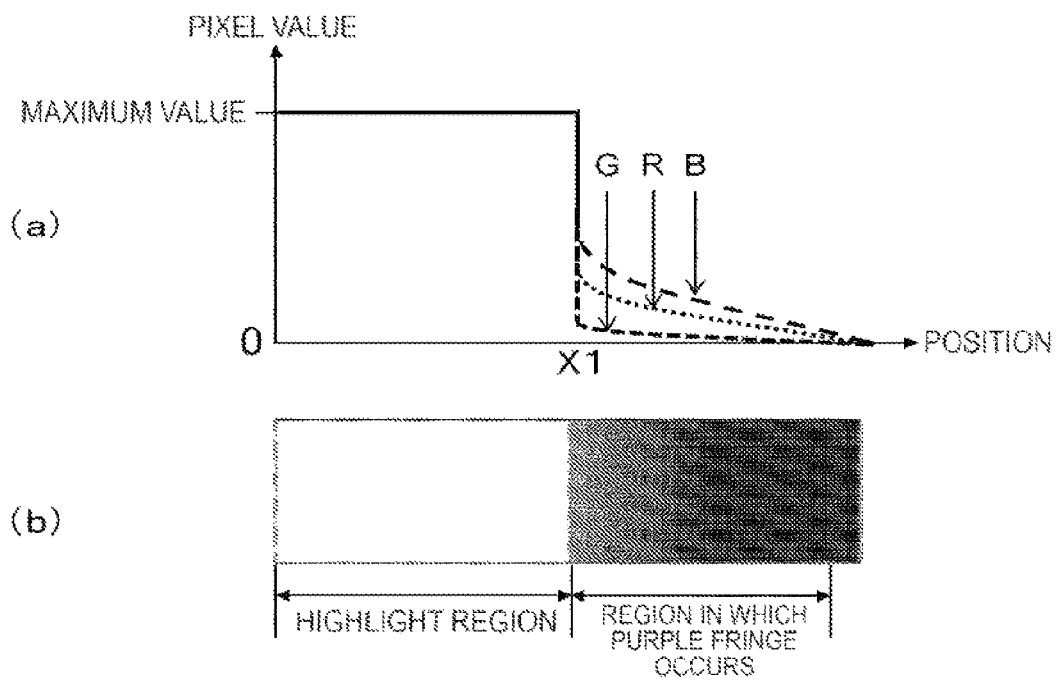
FIGS. 1(a) and 1(b) are diagrams illustrating a purple fringe occurrence region.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, an image processing device, an image processing method, and a program according to embodiments of the present disclosure will be described with reference to the drawings. The description will be made according to the following items.

1. Configuration and Process of Image Processing Device According to First Embodiment of the Present Disclosure
2. Configuration and Process of Image Processing Device According to Second Embodiment of the Present Disclosure
3. Configuration and Process of Image Processing Device According to Third Embodiment of the Present Disclosure
4. Configuration and Process of Image Processing Device According to Fourth Embodiment of the Present Disclosure
5. Advantages of Processes of Image Processing Device According to Embodiments of the Present Disclosure
6. Summarization of Configuration According to Embodiments of the Present Disclosure

1. Configuration and Process of Image Processing Device According to First Embodiment of the Present Disclosure An image processing device according to a first embodiment of the present disclosure performs a process on data acquired from an image sensor that has not only an RGB filter selectively transmitting light of respective RGB wavelengths but also an RGBW type color filter including white (W) and transmitting all light of RGB wavelengths.

Specifically, a two-dimensional pixel array signal, in which pixels serving as main components of luminance signals are arrayed in a checkerboard shape and a plurality of color pixels serving as color information components are arrayed in the remaining portions, is analyzed and pixel conversion is performed. Further, colors which are the main components of a luminance signal are white and green.

The image processing device according to the embodiment of the present disclosure performs a process of converting data acquired from the image sensor that has, for example, an RGBW type color filter including white (W), as shown in FIG. 2(b), into data with an RGB array (for example, a Bayer array) shown in FIG. 2(a). Hereinafter, this color array conversion process is referred to as a re-mosaic process.

The re-mosaic process which is a pixel array conversion process is disclosed in detail in, for example, Japanese Unexamined Patent Application Publication No. 2011-182354.

The image processing device according to the embodiment of the present disclosure performs a process of correcting purple fringe in the pixel array conversion process (re-mosaic process) of converting an image with the RGBW pixel array into an image with a Bayer array formed as the RGB pixel array.

The image with the Bayer array converted through the pixel array conversion process (re-mosaic process) is input to a signal processing unit on the rear stage.

The signal processing unit performs a de-mosaic process of setting all of the RGB pixel values in respective pixels from a mosaic image with a Bayer array or general signal processing such as a white balance (WB) adjustment process or a gamma correction process.

Signal processing units included in many cameras are configured to perform signal processing on the supposition that an image input from an image sensor is an image with a Bayer array formed as an RGB pixel array.

Accordingly, by converting an image input into the signal processing unit into an image with a Bayer array on the front stage, the signal processing unit according to the related art can be used without change.

Therefore, on the front stage in which an output from the image sensor having an RGBW array is input to the signal processing unit, a re-mosaic process of converting the RGBW array into a Bayer array is performed.

An exemplary configuration and exemplary processes of the image processing device according to an embodiment of the present disclosure will be described with reference to FIG. 3 and the subsequent drawings.

Figure 3:
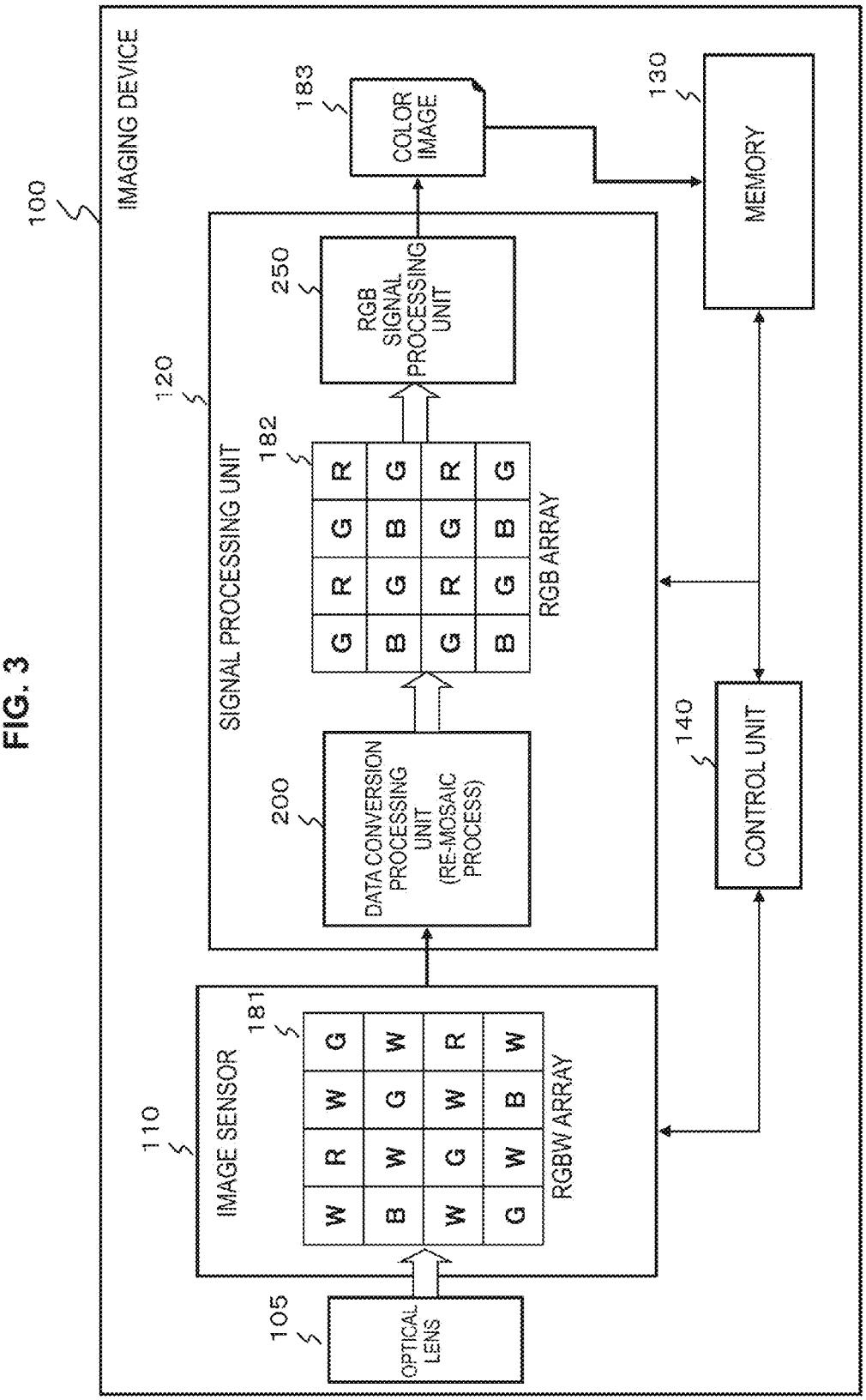
FIG. 3 is a diagram illustrating an example of the configuration of an image processing device according to an embodiment of the present disclosure.

FIG. 3 is a diagram illustrating the configuration of an imaging device 100 which is an image processing device according to an embodiment of the present disclosure.

The imaging device 100 includes an optical lens 105, an image sensor 110, a signal processing unit 120, a memory 130, and a control unit 140. The imaging device is an example of image processing device according to the embodiment of the present disclosure. An example of the image processing device according to the embodiment of the present disclosure includes a device such as a PC. The image processing device such as a PC does not include the optical lens 105 and the image sensor 110 of the imaging device 100 shown in FIG. 3 but includes the other constituent elements. The image processing device is configured to include an input unit that inputs data corresponding to data acquired from the image sensor 110 or a storage unit. Specifically, the imaging device 100 is a still camera, a video camera, or the like. Examples of the image processing device include not only the imaging device but also an information processing device such as a PC capable of performing image processing.

Hereinafter, the imaging device 100 will be described as a representative example of the image processing device according to the embodiment of the present disclosure. The image sensor 110 of the imaging device 100 shown in FIG. 3 is configured to include a filter that has an RGBW array 181 including white (W) shown in FIG. 4.

That is, as shown in FIG. 4, the image sensor 110 is an image sensor that has a filter with four kinds of spectroscopic characteristics:

red (R) transmitting wavelengths near red;
green (G) transmitting wavelengths near green;
blue (B) transmitting wavelengths near blue; and
white (W) transmitting all of RGB.

FIG. 4 shows a two-dimensional pixel array in which pixels (W) formed as main components of a luminance signal are arrayed in a checkerboard shape and pixels (RGB) of a plurality of colors formed as color information components are arrayed in the remaining portions As shown in FIG. 3, the image sensor 110 that has the filter with the RGBW array 181 receives one of RGBW light in each pixel unit via the optical lens 105, generates an electric signal corresponding to a light reception signal intensity through photoelectric conversion, and outputs the electric signal. A mosaic image formed from four kinds of RGBW spectroscopic characteristics can be acquired by the image sensor 110.

A signal output from the image sensor 110 is input to a data conversion processing unit 200 of the signal processing unit 120.

The data conversion processing unit 200 performs a pixel array conversion process from the RGBW array 181 to the RGB array 182. The data conversion processing unit 200 performs a process of suppressing purple fringe in the pixel array conversion process.

An RGB array 182 generated by the data conversion processing unit 200, that is, data that has a Bayer array, is data that has a color array acquired by an image sensor of a camera or the like according to the related art. The color array data is input to an RGB signal processing unit 250.

The RGB signal processing unit 250 performs the same process as that of a signal processing unit included in a camera or the like according to the related art. Specifically, a color image 183 is generated by performing a de-mosaic process, a white balance adjustment process, a γ correction process, and the like. The generated color image 183 is recorded in the memory 130.

The control unit 140 controls the series of processes. For example, since a program causing the series of processes to be executed is stored in the memory 130, the control unit 140 controls the series of processes by executing the program read from the memory 130.

The detailed configuration of the data conversion processing unit 200 will be described with reference to FIG. 5. The data conversion processing unit 200 performs a pixel array conversion process from the RGBW array 181 to the RGB array 182. Further, the process of suppressing purple fringe is also performed in the pixel array conversion process.

An input pixel unit to the data conversion processing unit 200 is set to 7×7 pixels centering on a processing target pixel to be subjected to the purple fringe removal process and pixel value conversion performed as the pixel array conversion process. That is, a process of setting a reference region that has 7×7 pixels centering on the processing target pixel is performed. Further, the processing target pixel is sequentially changed and the data conversion processing unit 200 performs a process sequentially on each pixel.

As the region with the size of the reference region set in the input pixel unit, a region with a size other than the size of the 7×7 pixels may be set.

Figure 5:
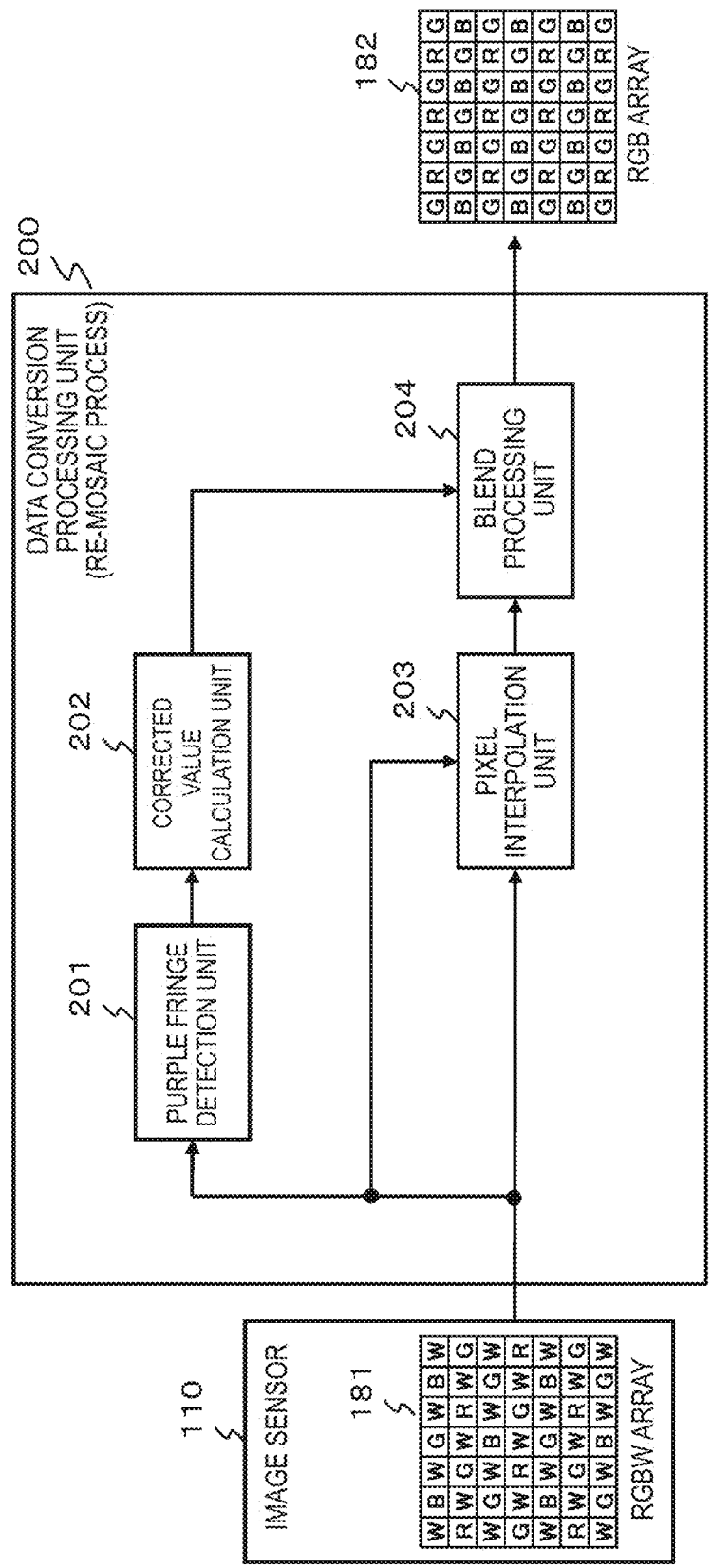
FIG. 5 is a diagram illustrating an example of the configuration of a data conversion processing unit of the image processing device according to the embodiment of the present disclosure.

As shown in FIG. 5, the data conversion processing unit 200 includes a purple fringe detection unit 201, a corrected value calculation unit 202, a pixel interpolation unit 203, and a blend processing unit 204.

The pixel interpolation unit 203 determines a pixel value of the processing target pixel (=a pixel of interest), that is, the central pixel of the input pixel unit (7×7 pixels) region so that the RGBW array 181 output from the image sensor 110 is converted into the RGB array 182.

The pixel of interest is a pixel of one of RGBW. The pixel interpolation unit 203 performs a pixel interpolation process of converting and setting the pixel located at the position of the pixel of interest into a pixel of one of RGB according to the RGB pixel array to be output.

The pixel interpolation process is performed as a process of selecting a pixel with the same color as that of one of RGB scheduled to be set from the reference region of the 7×7 pixels, setting the value of the selected pixel as a reference pixel and applying the pixel value of the reference pixel, and calculating the pixel value of the processing target pixel, that is, the central pixel of the 7×7 pixels.

In the interpolation process, a process in consideration of an edge direction or various known methods such as a method of using correlation between the W pixel of the reference region and RGB pixels can be applied.

The purple fringe detection unit 201 detects a purple fringe occurrence region.

Figure 6:
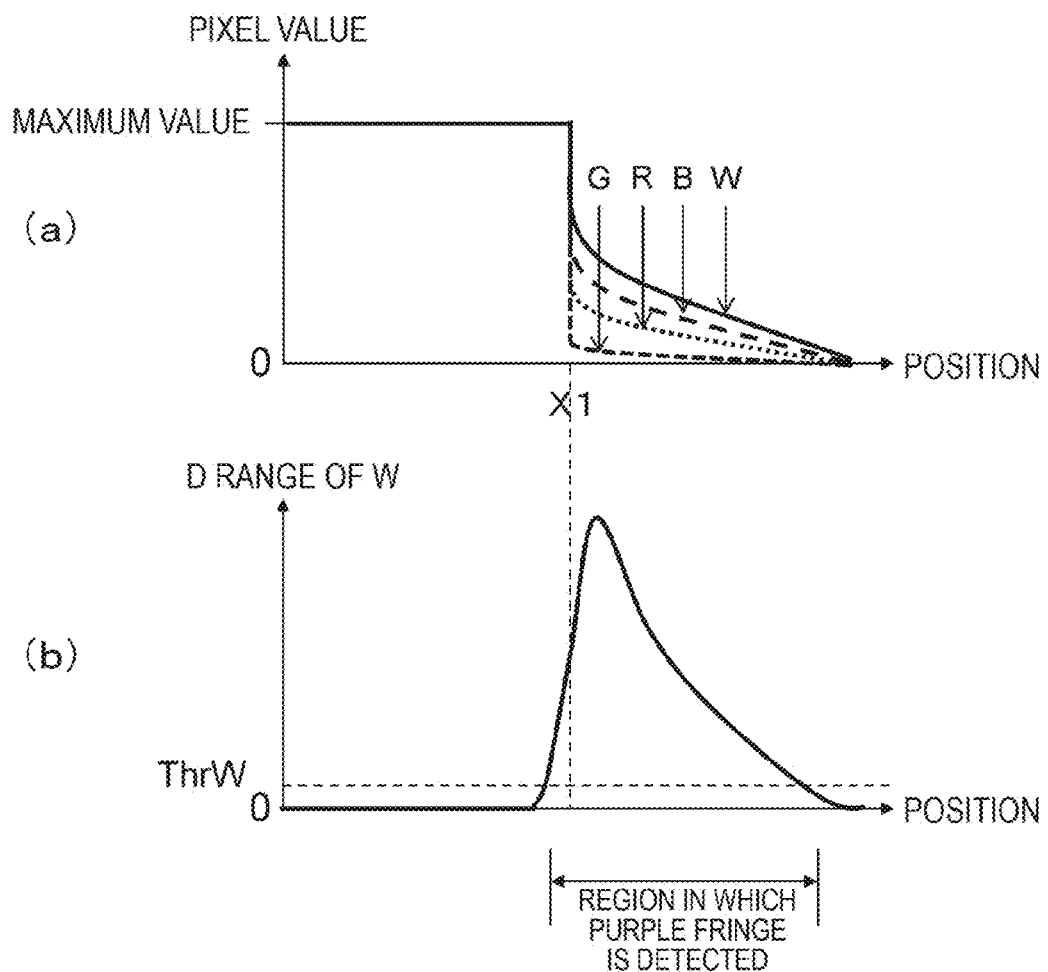
FIGS. 6(a) and 6(b) are diagrams illustrating correspondence between the purple fringe occurrence region and a W pixel dynamic range Wd.

A process of detecting the purple fringe occurrence region performed by the purple fringe detection unit 201 will be described with reference to FIGS. 6(a) and 6(b).

FIG. 6(a) is a diagram illustrating a correspondence relation between the position of the pixel of interest [horizontal axis] and each pixel value of RGBW [vertical axis]. FIG. 6(b) is a diagram illustrating a correspondence relation between the position of the pixel of interest [horizontal axis] and a W pixel dynamic range (the maximum W pixel value–the minimum W pixel value) [vertical axis] in the reference region (for example, 7×7 pixels) centering the pixel of interest. The horizontal axes representing the pixel position of the pixel of interest in FIGS. 6(a) and 6(b) have the same positional relation in FIGS. 6(a) and 6(b).

As described first with reference to FIGS. 1(a) and 1(b), the purple fringe frequently occurs in the vicinity of the overexposed region in the periphery of the edge in which a pixel value is sharply changed from the overexposed region with the maximum pixel value. In the region subsequent to X1 shown in FIG. 6(a), the purple fringe causing a false color is frequently detected.

As understood from the correspondence between FIGS. 6(a) and 6(b), the purple fringe occurrence region has characteristics of a large W pixel dynamic range (the maximum W pixel value–the minimum W pixel value) in the dereference region (for example, 7×7 pixels).

The purple fringe can be detected using a change ratio of the W pixel of the reference region, that is, a dynamic range, as an index.

Further, as understood from the pixel array shown in FIG. 4, the W pixels are arrayed most densely among the R, G, B, and W pixels. Accordingly, there is an advantage of improving detection accuracy by performing a determination process based on the dynamic range using the W pixels.

The purple fringe detection process will be described with reference to FIGS. 7(a) and 7(b).

Figure 7:
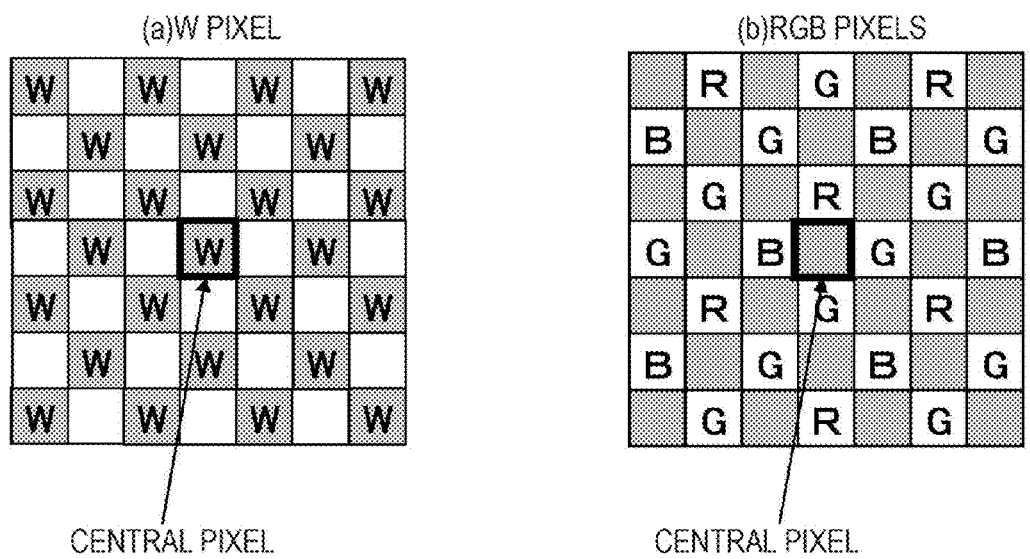
FIGS. 7(a) and 7(b) are diagrams illustrating a purple fringe correction process performed by the image processing device according to the embodiment of the present disclosure.
Figure 8:
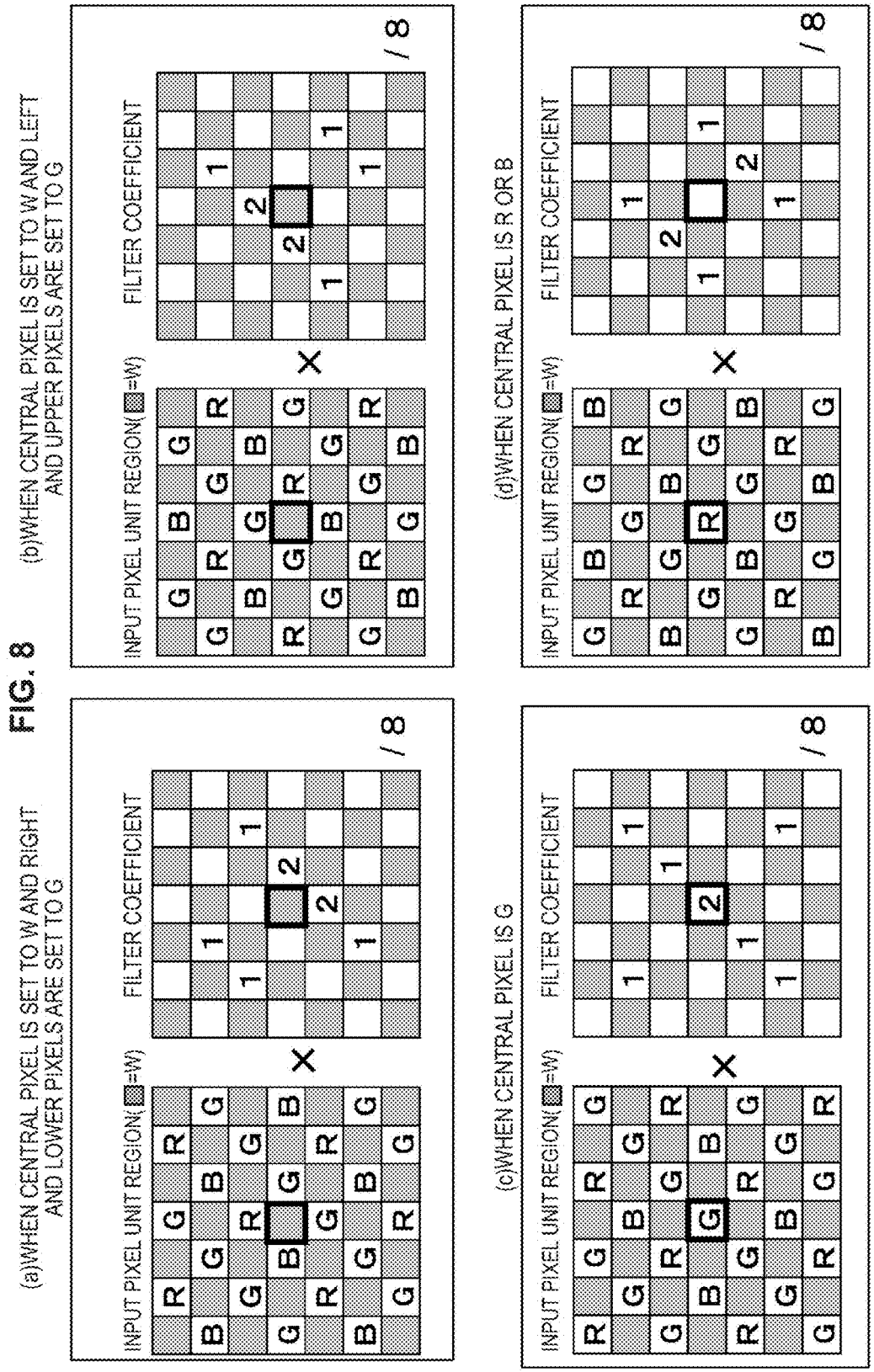
FIGS. 8(a) to 8(d) are diagrams illustrating setting examples of a filter (LPF) applied to the purple fringe correction process performed by the image processing device according to the embodiment of the present disclosure.

For example, the maximum value Wmax and the minimum value Wmin of the W pixels are calculated from the reference region (7×7 pixels) shown in FIG. 7(a).

Further, a W pixel dynamic range Wd is calculated by calculating a difference between the maximum and minimum values according to (Expression 1) below.

$$Wd = W\max - W\min \quad \text{(Expression 1)}$$

The W pixel dynamic range Wd is compared to a threshold value ThrW.

$$Wd > ThrW \quad \text{(Expression 2)}$$

When (Expression 2) described above is satisfied, that is, when the W pixel dynamic range Wd is greater than the previously defined threshold value ThrW, initial determination is performed to determine that the central pixel of interest of the reference region is a pixel in which the purple fringe occurs.

This determination is the initial determination. After the initial determination, the final determination is performed based on the RGB pixel values of the reference region. This process will be described below.

Conversely, when (Expression 2) described above is not satisfied, that is, when the W pixel dynamic range Wd is equal to or less than the previously defined threshold value ThrW, the central pixel of interest of the reference region is determined not to be the pixel in which the purple fringe occurs and a blend process to be described below is performed by setting the blend rate to 0. That is, the blend process is performed such that a pixel value generated by the corrected value calculation unit 202 is set not to be reflected in an output pixel value generated by the blend processing unit 204.

The final determination performed after the above-described initial determination will be described.

For example, in an image with high contrast such as a CZP chart, the value of the W pixel dynamic range Wd increases even in a region in which there is no saturated pixel and no purple fringe occurs. In this case, when the determination processes are performed according to (Expression 1) and (Expression 2) described above, erroneous detection is assumed to be performed since a region is determined to be a purple fringe occurrence region in spite of the fact that this region is not the purple fringe occurrence region.

To prevent such erroneous detection, as shown in FIG. 7(b), RGB pixels or RGBW pixels of the reference region are selected and the pixel values of the RGB pixels are verified, as in the process of calculating the W pixel dynamic range Wd.

That is, it is verified whether there is a saturated pixel in the RGB pixels or the RGBW pixels in the reference region (=an input pixel unit region of 7×7 pixels).

The following final determination is performed based on the verification process.

(1) When there is the saturated pixel in the RGB pixels or the RGBW pixels, the final determination is performed to validate the determination according to (Expression 1) and (Expression 2) described above.

(2) When there is no saturated pixel in the RGB pixels or the RGBW pixels, the determination according to (Expression 1) and (Expression 2) described above is invalidated. Therefore, even when the initial determination of determining that the pixel of interest is the pixel in which the purple fringe occurs is performed according to (Expression 1) and (Expression 2) described above, the final determination of determining that the pixel is not the pixel in which the purple fringe occurs is performed.

Whether pixels used to verify presence of the saturated pixel are set to the RGB pixels or the RGBW pixels is determined by the size of the reference region or the characteristics of the purple fringe desired to be corrected.

The corrected value calculation unit 202 performs pixel value correction on the pixel of interest finally determined to be the pixel in which the purple fringe is detected by the purple fringe detection unit 201.

That is, a corrected pixel value obtained by reducing the influence of the purple fringe is calculated as a corrected pixel value of the pixel in which the purple fringe is detected, and then the corrected pixel value is output to the blend processing unit 204.

The corrected value calculation unit 202 does not perform the pixel value correction on the pixel of interest determined not to be the pixel in which the purple fringe is detected by the purple fringe detection unit 201 and outputs the pixel value without change to the blend processing unit 204.

In the purple fringe occurrence region, a false color is produced since a ratio among the values of the RGB pixels is different from the original ratio. Therefore, a false color is suppressed by calculating a correction value from only the value of a G pixel without use of the values of R and B pixels and decreasing saturation of a false color occurrence region.

This process will be described with reference to FIGS. 8(a) to 8(d). As setting forms of a 7×7 pixel region which is a reference pixel region, four forms are shown in FIGS. 8(a) to 8(d).

FIG. 8(a) is a diagram illustrating a setting form in which the central pixel is set to W and the pixels on the right and lower sides of the central pixel are set to G.

FIG. 8(b) is a diagram illustrating a setting form in which the central pixel is set to W and the pixels on the left and upper sides of the central pixel are set to G.

FIG. 8(c) is a diagram illustrating a setting form in which the central pixel is set to G.

FIG. 8(d) is a diagram illustrating a setting form in which the central pixel is set to R or B.

The correction patterns of the purple fringe correction process performed by the corrected value calculation unit 202 are patterns for different processes according to the settings of the reference pixel regions in FIGS. 8(a) to 8(d).

First, a lowpass signal mG of a G pixel is calculated by performing convolution calculation in which lowpass filters (LPF) having LPF coefficients indicated as filter coefficients in FIGS. 8(a) to 8(d) are applied to the G pixel in the reference region according to the four kinds of patterns in FIGS. 8(a) to 8(d). The LPF coefficients shown in FIGS. 8(a) to 8(d) are examples of coefficients applied to calculate the lowpass signal mG of a G pixel, and coefficients to be applied are not limited to the examples of the coefficients.

The examples shown in the drawings are examples in which a process of calculating the lowpass signal mG by applying the G pixels of a 5×5 pixel region in the periphery of the pixel of interest at the central position of the 7×7 pixel reference regions to be corrected is performed.

The corrected value calculation unit 202 first calculates a G lowpass signal mG corresponding to a central correction target pixel (pixel of interest) of the reference region by applying the LPF according to each of the settings of the four reference regions shown in FIGS. 8(a) to 8(d).

Next, the corrected pixel value of the pixel of interest, that is, the central pixel of the reference pixel region of the 7×7 pixels, is calculated by applying the calculated G lowpass signal mG.

The corrected pixel value is calculated according to (Expression 3g), (Expression 3r), and (Expression 3b) below.

Each of (Expression 3g), (Expression 3r), and (Expression 3b) below is an expression selectively applied according to the color (RGB) of an output pixel of a conversion destination.

That is, each expression is an expression selectively applied according to a color (RGB) of the pixel of interest, that is, a color (RGB) of the pixel set at the position of the central pixel of the reference pixel region of the 7×7 pixels in the RGB array 182 which is an output image shown in FIG. 5, that is, according to the color (RGB) of the output pixel of the conversion destination converted through the re-mosaic process.

(1) When the pixel of the conversion destination is a G pixel, a correction value g' is calculated according to (Expression 3g) below:

$$g'=mG \qquad \text{(Expression 3g)}.$$

(2) When the pixel of the conversion destination is an R pixel, a correction value r' is calculated according to (Expression 3r) below:

$$r'=mG/\text{gainR} \qquad \text{(Expression 3r)}.$$

(3) When the pixel of the conversion destination is a B pixel, a correction value b' is calculated according to (Expression 3b) below:

$$b'=mG/\text{gainB} \qquad \text{(Expression 3b)}.$$

In the above-described expressions, gainR indicates a white balance gain of an R pixel and gainB indicates a white balance gain of a B pixel.

The corrected value calculation unit 202 calculates the corrected pixel values r', g', and b' of the pixels of interest determined to be the purple fringe pixels and outputs the corrected pixel values r', g', and b' to the blend processing unit 204.

The corrected value calculation unit 202 does not calculate the corrected pixel value of the pixel of interest determined not to be the purple fringe pixel and outputs the input pixel value before the correction to the blend processing unit 204 without change.

The blend processing unit 204 calculates final pixel values by blending the output signals (r, g, and b) of the pixel interpolation unit 203 with the output signal of the corrected value calculation unit 202 at the position of each correspondence pixel according to (Expression 4G), (Expression 4R), and (Expression 4B) below and outputs the final pixel values.

(1) When the conversion destination is a G pixel, an output value G is calculated according to (Expression 4G) below:

$$G=(1-\text{rate})\times g+\text{rate}\times g' \qquad \text{(Expression 4G)}.$$

(2) When the conversion destination is an R pixel, an output value R is calculated according to (Expression 4R) below:

$$R=(1-\text{rate})\times r+\text{rate}\times r' \qquad \text{(Expression 4R)}.$$

(3) When the conversion destination is a B pixel, an output value B is calculated according to (Expression 4B) below:

$$B=(1-\text{rate})\times b+\text{rate}\times b' \qquad \text{(Expression 4B)}.$$

(Expression 4G), (Expression 4R), and (Expression 4B) described above are calculation expressions used to calculate the output values R, G, and B as the results of the blend process (weighted addition) obtained by assuming that a blend rate (weight) of each pixel value of the pixel values r', g', and b' obtained after the purple fringe correction is rate and assuming that each blend rate (weight) of the pixel values r, g, and b interpolated by the pixel interpolation unit 203 performing the re-mosaic process from the RGBW array to the RGB array is (1−rate).

Since the intensity of a false color is nearly proportional to the W pixel dynamic range Wd in the reference region, a value, rate, obtained by normalizing the W pixel dynamic range Wd to a range of 0 to 1 is set to a blend rate according to (Expression 5) below:

$$\text{rate}=Wd/\text{MAX} \qquad \text{(Expression 5)}.$$

MAX indicates the maximum value of the W pixel dynamic range Wd.

Figure 9:
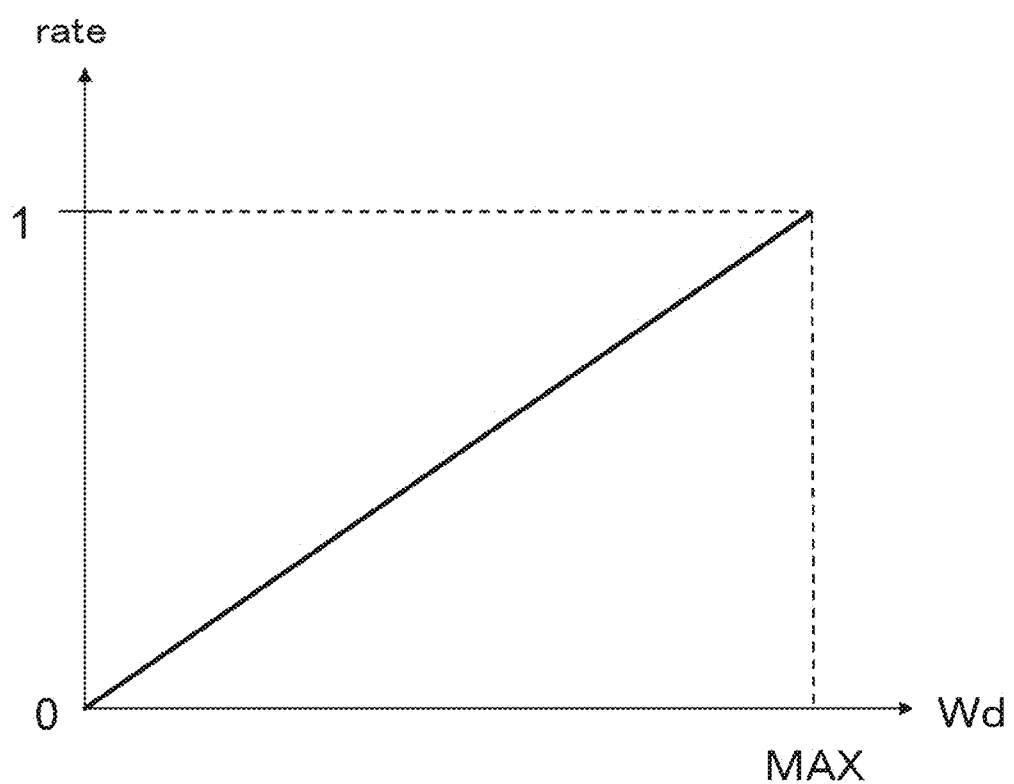
FIG. 9 is a diagram illustrating a setting example of a blend rate rate applied to a blend process performed by the data conversion processing unit of the image processing device according to the embodiment of the present disclosure.

That is, the blend process of applying the blend rate (rate) set in FIG. 9 is performed.

The corrected value calculation unit 202 performing the purple fringe correction calculates the corrected pixel values r', g', and b' of the pixels of interest determined to be the purple fringe pixels and outputs the corrected pixel values r', g', and b' to the blend processing unit 204. Accordingly, the blend processing unit 204 calculates the final pixel values RGB by directly applying (Expression 4G), (Expression 4R), and (Expression 4B) described above to the pixels of the purple fringe.

However, the corrected value calculation unit 202 performing the purple fringe correction does not calculate the corrected pixel values r', g', and b' of the pixels of interest determined not to be the purple fringe pixels and outputs the pixel values of the RGBW of the input image to the blend processing unit 204 without change.

Accordingly, the pixel values input to the blend processing unit 204 are still the pixel values of RGBW according to the RGBW array before the conversion of the pixel array. However, the blend processing unit 204 performs the process by interpreting the pixel values of RGBW as the pixel values of RGB according to the RGB array 182 after the conversion of the pixel array, that is, the corrected pixel values r', g', and b' obtained according to (Expression 4G), (Expression 4R), and (Expression 4B) described above.

In this case, the blend rate (rate) in (Expression 4G), (Expression 4R), and (Expression 4B) described above is set to rate=0 and the process of calculating the final output values RGB is performed.

That is, when a pixel is not the pixel in which the purple fringe occurs, the blend processing unit 204 outputs the pixel values obtained through the interpolation process by the pixel interpolation unit 203 without change.

Thus, the blend processing unit 204 determines the output pixel values through one of the processes below:

(a) a process of determining the output pixel values for the pixels in which the purple fringe occurs by blending the pixel values r, g, and b generated by the pixel interpolation unit 203 with the pixel values r', g', and b' generated by the corrected value calculation unit 202 according to the blend rate determined according to the W pixel dynamic range Wd of the reference region; and (b) a process of setting the pixel values r, g, and b generated by the pixel interpolation unit 203 as the output pixel values for the pixels in which no purple fringe occurs.

The data conversion processing unit 200 reduces the purple fringe in addition to the re-mosaic process of converting the RGBW array into the RGB array, generates the output image having the RGB array 182, and outputs the output image to the RGB signal processing unit 250.

Figure 10:
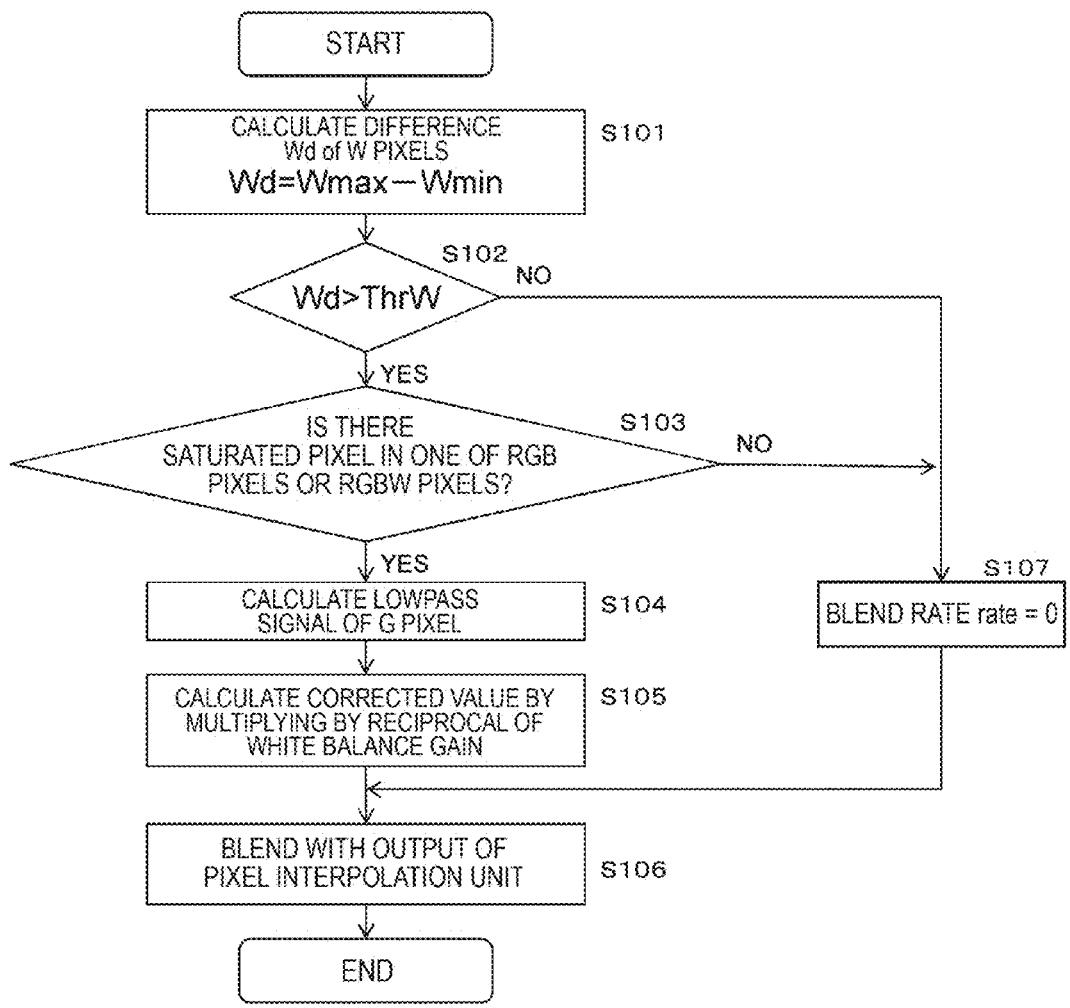
FIG. 10 is a flowchart illustrating a sequence of a process performed by the image processing device according to the embodiment of the present disclosure.

The flowchart of a processing sequence performed by the data conversion processing unit 200 is shown in FIG. 10.

FIG. 10 is the flowchart of detection of the purple fringe, the calculation of the correction values, and the blend process performed by the data conversion processing unit 200. Hereinafter, the process of each step will be described.

Steps S101, S102, and S103 are processes performed by the purple fringe detection unit 201 of the data conversion processing unit 200 shown in FIG. 5.

First, in step S101, a difference between the maximum and minimum values of the W pixels in the input pixel unit region formed from the reference region including the pixel of interest to be corrected, that is, the W pixel dynamic range Wd, is calculated.

In the example described above in the embodiment, the input pixel unit region is the 7×7 pixel region including the pixel of interest to be corrected.

The maximum value (Wmax) and the minimum value (Wmin) of the W pixels included in the 7×7 pixel region are acquired and the W pixel dynamic range Wd is calculated according to the following expression:

$$Wd = W\text{max} - W\text{min}.$$

Next, in step S102, the W pixel dynamic range Wd is compared to the threshold value ThrW to determine whether the W pixel dynamic range Wd is greater than the threshold value ThrW.

That is, Wd>ThrW.

It is determined whether the above-described determination expression is satisfied.

The threshold value ThrW may be a fixed value, may be a value settable by a user, or may automatically be calculated.

As described above with reference to FIGS. 6(*a*) and 6(*b*), the case in which the W pixel dynamic range Wd is greater than the threshold value ThrW indicates a region in which the occurrence possibility of the purple fringe is high. Further, the case in which the W pixel dynamic range Wd is not greater than the threshold value ThrW indicates a region in which the occurrence possibility of the purple fringe is low.

When the determination expression is not satisfied, that is, the W pixel dynamic range Wd is not greater than the threshold value ThrW, the process proceeds to step S107.

In step S107, the blend rate rate is set to 0. That is, the blend rate of the output pixel value of the corrected value calculation unit 202 calculating the output pixel value is set to 0 in the blend process of calculating the output pixel value in the blend processing unit 204 of the data conversion processing unit 200 shown in FIG. 5.

The blend rate rate is a blend rate set according to (Expression 4G), (Expression 4R), and (Expression 4B) described above.

That is, when the conversion destination is a G pixel, the calculation expression of the output value G is as follows:

$$G = (1-\text{rate}) \times g + \text{rate} \times g' \quad \text{(Expression 4G)}.$$

When the conversion destination is an R pixel, the calculation expression of the output value R is as follows:

$$R = (1-\text{rate}) \times r + \text{rate} \times r' \quad \text{(Expression 4R)}.$$

When the conversion destination is a B pixel, the calculation expression of the output value B is as follows:

$$B = (1-\text{rate}) \times b + \text{rate} \times b' \quad \text{(Expression 4B)}.$$

The blend rate rate is set according to the calculation expressions of the output pixel values.

That is, when the W pixel dynamic range Wd is not greater than the threshold value ThrW and the region is determined to be the region in which the occurrence possibility of the purple fringe is small, the blend process of step S106 is performed with the blend rate rate=0 set according to (Expression 4G), (Expression 4R), and (Expression 4B).

As a result, when the W pixel dynamic range Wd is not greater than the threshold value ThrW and the region is determined to be the region in which the occurrence possibility of the purple fringe is low, the interpolation pixel value set by the pixel interpolation unit 203 of the data conversion processing unit 200 shown in FIG. 5 is set as the output pixel value.

Conversely, when the W pixel dynamic range Wd is compared to the threshold value ThrW and the determination expression of Wd>ThrW is satisfied in step S102, the process proceeds to step S103.

The case in which the determination expression is satisfied is a case in which the region is determined to be a region in which the occurrence possibility of the purple fringe is high.

In this case, in step S103, it is examined whether there is a saturated RGB pixel or the saturated RGBW pixel in the input pixel unit region.

In the above-described embodiment, the input pixel unit region is the 7×7 pixel region including the pixel of interest to be corrected.

It is determined whether there is the saturated pixel value in the RGB pixels or the RGBW pixels included in the 7×7 pixel region.

When there is no saturated pixel in the RGB pixels or the RGBW pixels, the process proceeds to step S107 and the blend rate rate is set to 0. That is, in the blend process of calculating the output pixel value in the blend processing unit 204 of the data conversion processing unit 200 shown in FIG. 5, the blend rate of the output pixel value of the corrected value calculation unit 202 is set to 0.

The blend rate rate is the blend rate set according to (Expression 4G), (Expression 4R), and (Expression 4B) described above.

The case in which there is no one saturated pixel in the RGB pixels or the RGBW pixels in the input pixel unit region, that is, the reference region, is a case in which the region is determined not to be the purple fringe occurrence region.

In this case, the blend process is performed according to (Expression 4G), (Expression 4R), and (Expression 4B) described above by setting the blend rate of the output pixel value of the corrected value calculation unit 202 to 0, and the interpolated pixel value calculated by the pixel interpolation unit 203 is set as the output pixel value.

Conversely, when there is the saturated RGB pixel or the saturated RGBW pixel in the input pixel unit region in step S103, the process proceeds to step S104.

The processes of steps S104 and S105 are processes performed by the corrected value calculation unit 202 of the data conversion processing unit 200 shown in FIG. 5.

In step S104, the lowpass signal of the G pixel is calculated by applying the G pixel value of the reference region which is the input pixel unit region.

This process is a process performed by applying the LPF selected according to the pixel array described above with reference to FIGS. 8(*a*) to 8(*d*).

In step S105, a corrected value is calculated by multiplying the lowpass signal of the G pixel by the reciprocal of the white balance gain. Specifically, the corrected value is calculated according to the color of the pixel value obtained after the conversion by applying (Expression 3g), (Expression 3r), and (Expression 3b) described above. That is, the following processes are performed.

(1) When the pixel of the conversion destination is the G pixel, the corrected value g' is calculated according to (Expression 3g) below:

$$g' = mG \quad \text{(Expression 3g)}.$$

(2) When the pixel of the conversion destination is an R pixel, a corrected value r' is calculated according to (Expression 3r) below:

$$r' = mG/\text{gain}R \quad \text{(Expression 3r)}.$$

(3) When the pixel of the conversion destination is a B pixel, a corrected value b' is calculated according to (Expression 3b) below:

$$b' = mG/gainB \quad \text{(Expression 3b).}$$

The process of step S106 is a process performed by the blend processing unit 204 of the data conversion processing unit 200 shown in FIG. 5.

In step S106, the output signal of the pixel interpolation unit 203 is blended with the output signal of the corrected value calculation unit 202 according to the blend rate rate.

That is, as described above, the output pixel values are calculated according to the following calculation expressions.

(a) When the conversion destination is the G pixel, the calculation expression of the output value G is as follows:

$$G = (1-\text{rate}) \times g + \text{rate} \times g' \quad \text{(Expression 4G).}$$

(b) When the conversion destination is the R pixel, the calculation expression of the output value R is as follows:

$$R = (1-\text{rate}) \times r + \text{rate} \times r' \quad \text{(Expression 4R).}$$

(c) When the conversion destination is the B pixel, the calculation expression of the output value B is as follows:

$$B = (1-\text{rate}) \times b + \text{rate} \times b' \quad \text{(Expression 4B).}$$

The output pixel values of the output image having the RGB array 182 shown in FIG. 5 are calculated according to these expressions.

In the flowchart shown in FIG. 10, the process of the pixel interpolation unit 203 of the data conversion processing unit 200 shown in FIG. 5 has not been described.

The pixel interpolation unit 203 performs the re-mosaic process of converting the RGBW array into the RGB array by applying the known process.

In step S106 of the flow shown in FIG. 10, the pixel values r, g, and b generated by the pixel interpolation unit 203 of the data conversion processing unit 200 shown in FIG. 5 and the pixel values of the same pixel positions as the pixel values of the pixel values r', b', and g' output by the corrected value calculation unit 202 are blended according to the blend rate rate determined according to (Expression 4R), (Expression 4G), and (Expression 4B) described above, and the output pixel values are determined.

By performing such processes, it is possible to generate the image that has the RGB array 182 from which the pixel value error such as a false color caused due to the purple fringe is reduced.

The image that has the RGB array 182 generated by the data conversion processing unit 200 shown in FIG. 5 is input to the RGB signal processing unit 250, as shown in FIG. 3.

The RGB signal processing unit 250 performs the same process as a signal processing unit included in a camera or the like according to the related art. Specifically, the color image 183 is generated by performing a de-mosaic process, a white balance adjustment process, a γ correction process, and the like. The generated color image 183 is recorded in the memory 130.

2. Configuration and Process of Image Processing Device According to Second Embodiment of the Present Disclosure Next, the configuration and processes of an image processing device according to a second embodiment of the present disclosure will be described.

In the first embodiment described above, the corrected value calculation unit 202 of the data conversion processing unit 200 shown in FIG. 5 performs the following processes in the corrected value calculation process on a pixel in which the purple fringe occurs.

First, as described with reference to FIGS. 8(a) to 8(d), the process of calculating the lowpass signal mG is performed by applying the G pixel within the reference region.

Then, the corrected pixel values g', r', and b' are calculated using the calculated lowpass signal mG by applying (Expression 3g), (Expression 3r), and (Expression 3b) described above.

That is, the process is performed according to the following expressions.

(1) When the pixel of the conversion destination is a G pixel, the corrected value g' calculation expression is as follows:

$$g' = mG \quad \text{(Expression 3g).}$$

(2) When the pixel of the conversion destination is an R pixel, the corrected value r' calculation expression is as follows:

$$r' = mG/gainR \quad \text{(Expression 3r).}$$

(3) When the pixel of the conversion destination is a B pixel, the corrected value b' calculation expression is as follows:

$$b' = mG/gainB \quad \text{(Expression 3b).}$$

In the above-described expressions, gainR indicates a white balance gain of the R pixel and gainB indicates a white balance gain of the B pixel.

In this embodiment, the corrected value calculation unit 202 calculates a lowpass signal mW of the W pixel rather than the lowpass signal mG of the G pixel of the reference region and generates corrected pixel values r', b', and g' in which the purple fringe is reduced, from the lowpass signal mW of the W pixel.

That is, the lowpass signal mW of the W pixel is calculated by performing convolution calculation by applying the LPF to the pixel values of the W pixels of the reference region (for example, a 7×7 pixel region) in which a pixel of interest is at the center.

Further, the corrected pixel values g', r', and b' are calculated by applying the calculated lowpass signal mW of the W pixel according to (Expression 6g), (Expression 6r), and (Expression 6b) below.

(1) When the pixel of the conversion destination is a G pixel, the corrected value g' is calculated according to (Expression 6g) below.

$$g' = mW/\text{sense}WG \quad \text{(Expression 6g)}$$

(2) When the pixel of the conversion destination is an R pixel, the corrected value r' is calculated according to (Expression 6r) below.

$$r' = mW/gainR/\text{sense}WG \quad \text{(Expression 6r)}$$

(3) When the pixel of the conversion destination is a B pixel, the corrected value b' is calculated according to (Expression 6r) below.

$$b' = mW/gainB/\text{sense}WG \quad \text{(Expression 6b)}$$

In the above-described expressions, gainR indicates a white balance gain of the R pixel, gainB indicates a white balance gain of the B pixel, senseWG indicates a sensitivity ratio of the W pixel to the G pixel expressed in (Expression 7) below:

senseWG=(sensitivity of $W$)/(sensitivity of $G$)  (Expression 7).

Thus, in the second embodiment, in the process of calculating the corrected pixel values of the purple fringe pixels, the lowpass signal mW of the W pixel of the reference region is calculated and the corrected pixel values g', r', and b' are calculated by applying the calculated lowpass signal mW of the W pixel.

3. Configuration and Process of Image Processing Device According to Third Embodiment of the Present Disclosure Next, the configuration and processes of an image processing device according to a third embodiment of the present disclosure will be described.

In the first embodiment described above, the blend processing unit 204 of the data conversion processing unit 200 shown in FIG. 5 generates the output pixel values RGB by blending the corrected pixel values r', g', and b' obtained after the purple fringe reduction process of the corrected value calculation unit 202 with the pixel values r, g, and b generated through the interpolation process of the pixel interpolation unit 203 according to a predetermined blend rate rate. That is, the blend process is performed according to (Expression 4R), (Expression 4G), and (Expression 4B) described above.

A blend rate rate applied to the blend process is set based on a W pixel dynamic range Wd of the reference region, as shown in FIG. 9. That is, the blend rate rate is set according to (Expression 5) described above, that is, the following expression.

rate=$Wd$/MAX  (Expression 5)

In this embodiment, the blend rate is set to one of 0 and 1.

The blend rate rate is set to 1.0 for a pixel determined to be a pixel in which the purple fringe is detected.

The blend rate rate is set to 0.0 for a pixel determined not to be the pixel in which the purple fringe is detected.

When this process is performed, the pixel value of the pixel determined to be the pixel in which the purple fringe is detected is substituted with a corrected pixel value corrected by the corrected value calculation unit 202.

As the pixel value of the pixel determined not to be the pixel in which the purple fringe is detected, the pixel value of the pixel interpolation unit 203 is output without change.

When this process is performed, it is possible to omit the process of performing the blend process according to various blend rates rate and determining the output pixel values, that is, the process of calculating the output pixel values according to (Expression 4R), (Expression 4G), and (Expression 4B) described above. Therefore, a number of processes can be reduced.

However, there is a probability of artifacts occurring in a boundary between the region in which the purple fringe is detected and the region in which no purple fringe is detected.

4. Configuration and Process of Image Processing Device According to Fourth Embodiment of the Present Disclosure Next, the configuration and processes of an image processing device according to a fourth embodiment of the present disclosure will be described.

In the first embodiment described above, the input image is an image that has the RGBW array.

Hereinafter, a configuration and processes of the image processing device when the input image is configured to have an RGB array will be described according to the fourth embodiment. In this case, a color serving as the main component of luminance is a G pixel.

Figure 11:
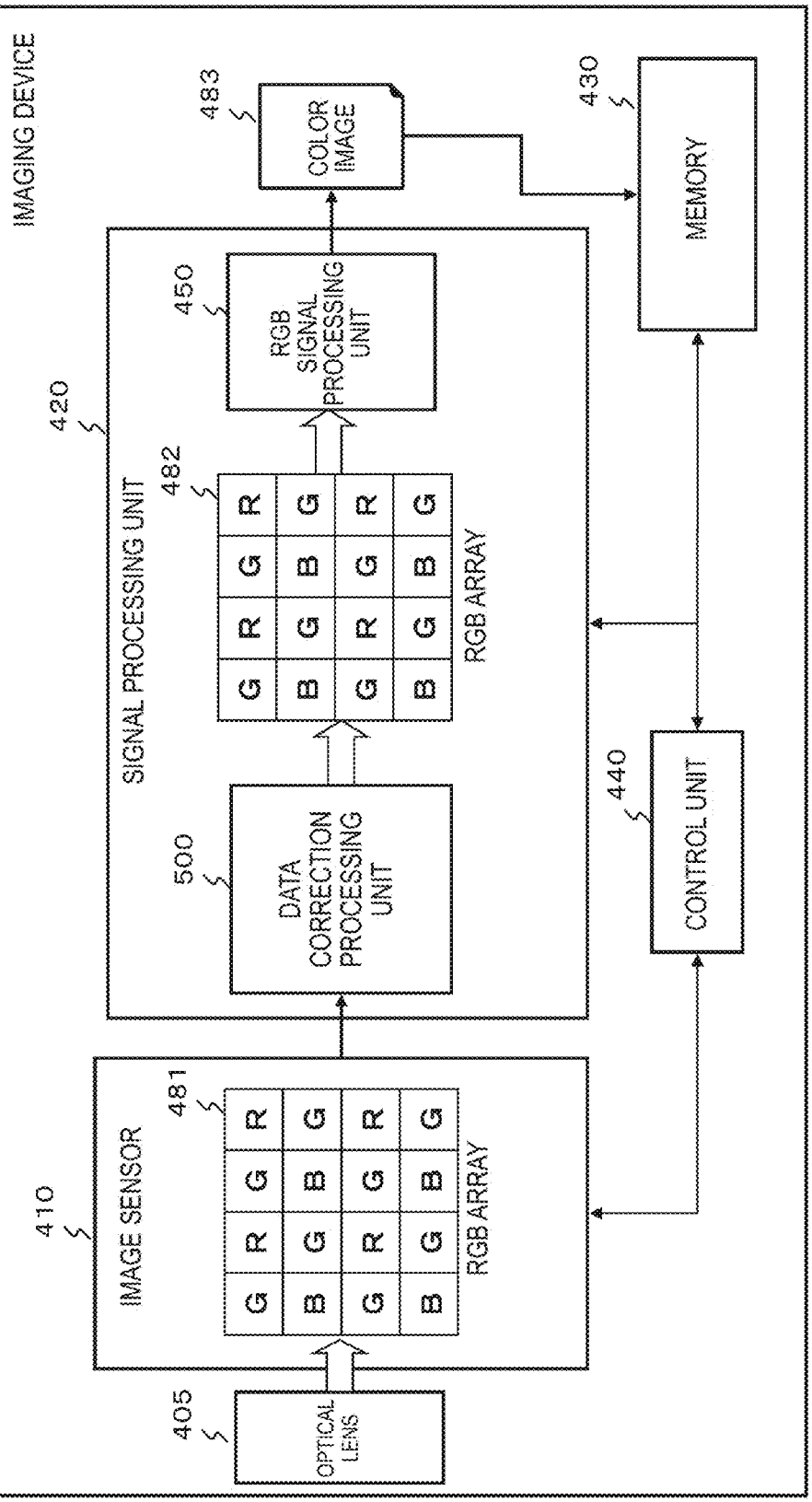
FIG. 11 is a diagram illustrating an example of the configuration of an image processing device according to an embodiment of the present disclosure.

FIG. 11 is a diagram illustrating an example of the configuration of an imaging device 400 which is one example of the image processing device according to the fourth embodiment.

The imaging device 400 shown in FIG. 11 has substantially the same configuration as the imaging device 100 described above as the imaging device in FIG. 3 according to the first embodiment The imaging device 400 includes an optical lens 405, an image sensor 410, a signal processing unit 420, a memory 430, and a control unit 440. The imaging device is a kind of image processing device according to the embodiment of the present disclosure. An example of the image processing device according to the embodiment of the present disclosure includes a device such as a PC. The image processing device such as a PC does not include the optical lens 405 and the image sensor 410 of the imaging device 400 shown in FIG. 11 but includes the other constituent elements. The image processing device is configured to include an input unit that inputs data corresponding to data acquired from the image sensor 410 or a storage unit. Specifically, the imaging device 400 is a still camera, a video camera, or the like. Examples of the image processing device include not only the imaging device but also an information processing device such as a PC capable of performing image processing.

The image sensor 410 of the imaging device 400 shown in FIG. 11 is configured to include a filter formed by RGB of an RGB array 481 having no white (W) pixels, for example, the Bayer array shown in FIG. 2(*a*), unlike the first embodiment described above.

That is, the image sensor 410 is an image sensor that has a filter with three kinds of spectroscopic characteristics:

red (R) transmitting wavelengths near red;
green (G) transmitting wavelengths near green; and
blue (B) transmitting wavelengths near blue.

An output signal from the image sensor 410 is input to a data correction processing unit 500 of the signal processing unit 420. The data correction processing unit 500 performs a process of suppressing purple fringe. Further, the data correction processing unit 500 according to the fourth embodiment does not perform the re-mosaic process performed by the data conversion processing unit 200 according to the first embodiment, that is, the array conversion process from the RGBW array to the RGB array.

The detailed configuration of the data correction processing unit 500 will be described with reference to FIG. 12.

An input pixel unit to the data correction processing unit 500 is set to 7×7 pixels centering on a processing target pixel to be subjected to a pixel value correction process. That is, a process of setting a reference region that has 7×7 pixels centering on the processing target pixel is performed. Further, the processing target pixel is sequentially changed and the data correction processing unit 500 performs a process sequentially on each pixel.

As the region with the size of the reference region set in the input pixel unit, a region with a size other than the size of the 7×7 pixels may be set.

Figure 12:
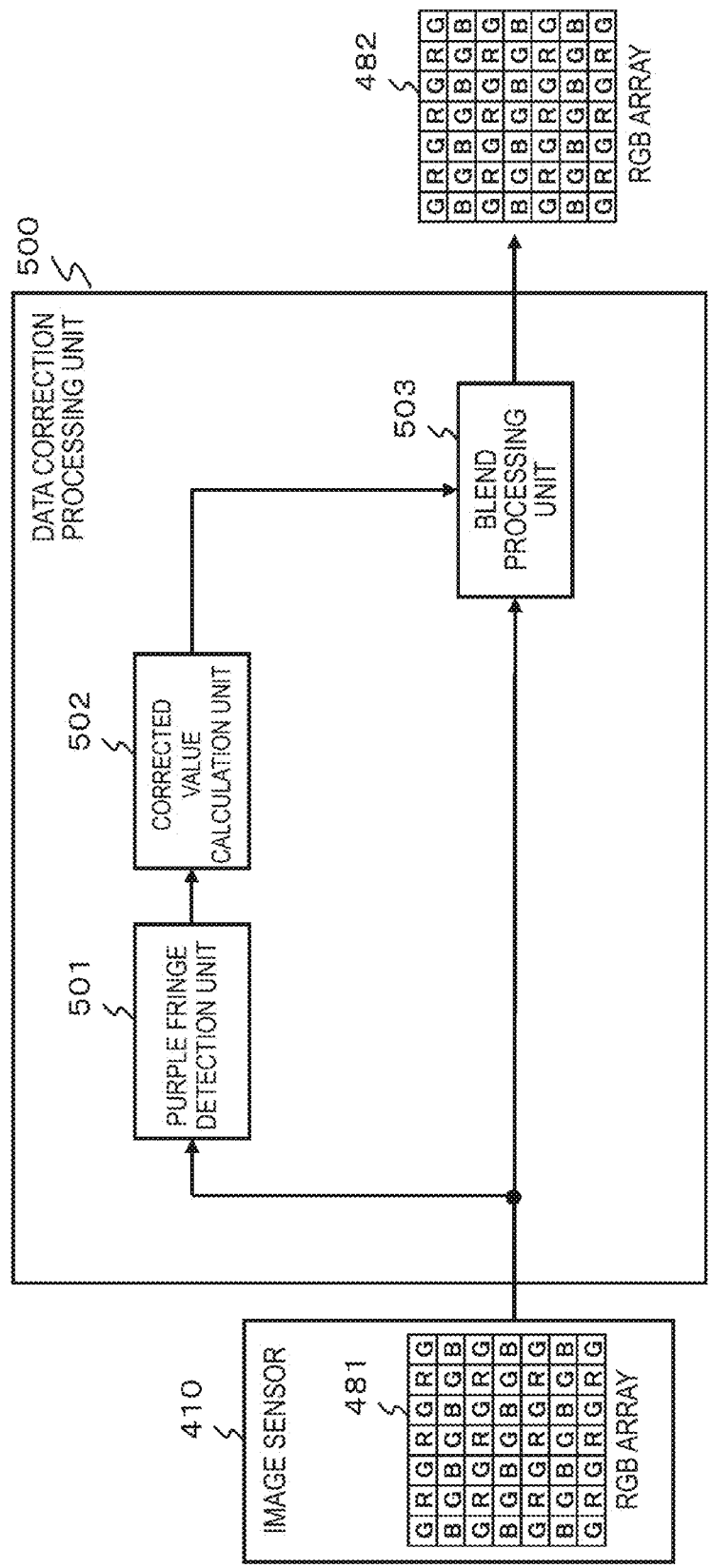
FIG. 12 is a diagram illustrating an example of the configuration of a data correction processing unit of the image processing device according to the embodiment of the present disclosure.

As shown in FIG. 12, the data correction processing unit 500 includes a purple fringe detection unit 501, a corrected value calculation unit 502, and a blend processing unit 503.

The purple fringe detection unit 501 detects a purple fringe occurrence region.

Figure 13:
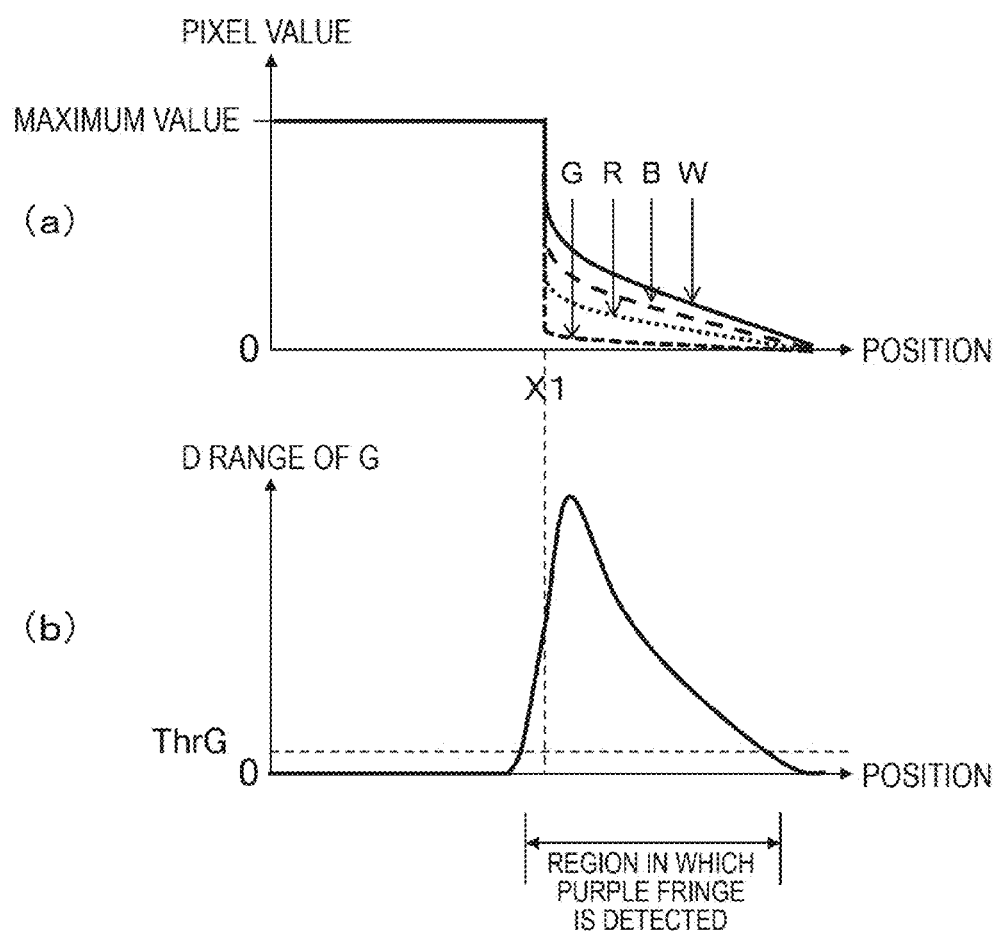
FIGS. 13(a) and 13(b) are diagrams illustrating correspondence between a purple fringe occurrence region and a G pixel dynamic range Gd.

A process of detecting the purple fringe occurrence region performed by the purple fringe detection unit 501 will be described with reference to FIGS. 13(*a*) and 13(*b*).

FIG. 13(a) is a diagram illustrating a correspondence relation between the position of the pixel of interest [horizontal axis] and each pixel value of RGB [vertical axis]. FIG. 13(b) is a diagram illustrating the position of the pixel of interest [horizontal axis] and a G pixel dynamic range (the maximum G pixel value−the minimum G pixel value) [vertical axis] in the reference region (for example, 7×7 pixels) centering on the pixel of interest. The horizontal axes representing the pixel position of the pixel of interest in FIGS. 13(a) and 13(b) have the same positional relation in FIGS. 13(a) and 13(b).

As described first with reference to FIGS. 1(a) and 1(b), the purple fringe frequently occurs in the vicinity of the overexposed region in the periphery of the edge in which a pixel value is sharply changed from the overexposed region with the maximum pixel value. In the region subsequent to X1 shown in FIG. 13(a), the purple fringe causing a false color is frequently detected.

As understood from the correspondence between FIGS. 13(a) and 13(b), the purple fringe occurrence region has characteristics of a large G pixel dynamic range (the maximum G pixel value−the minimum G pixel value) in the dereference region (for example, 7×7 pixels).

The purple fringe can be detected using a change ratio of the G pixel of the reference region, that is, a dynamic range, as an index.

Further, as understood from the pixel array (Bayer array) shown in FIG. 2(a), the G pixels are arrayed most densely among the R, G, and B pixels. Accordingly, there is also an advantage of improving detection accuracy by performing a determination process based on the dynamic range using the G pixels.

The purple fringe detection process will be described with reference to FIGS. 14(a) and 14(b).

Figure 14:
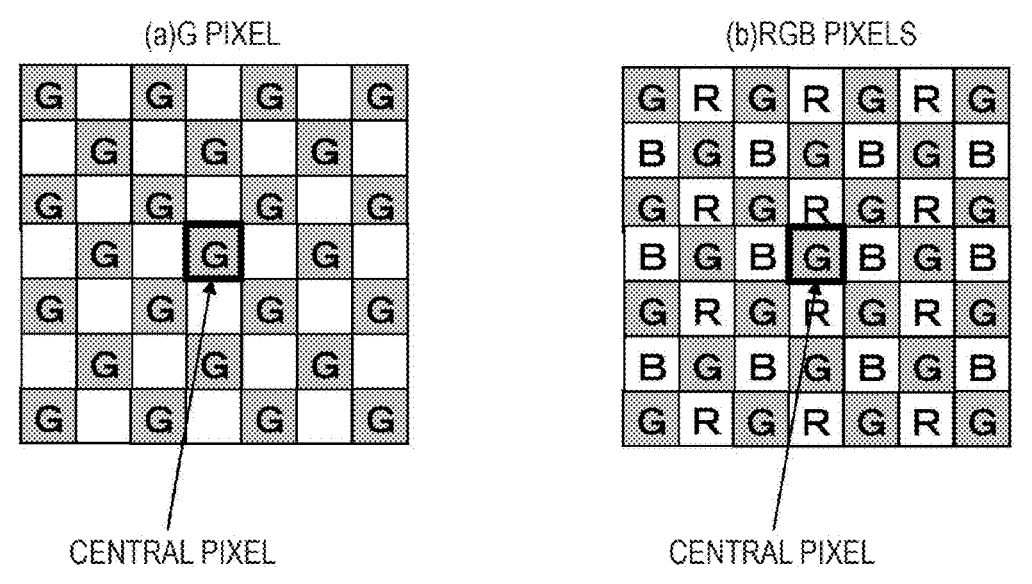

The purple fringe detection unit 501 first calculates the maximum value Gmax and the minimum value Gmin of the G pixels from, for example, the reference region (7×7 pixels) shown in FIG. 14(a).

Further, a G pixel dynamic range Gd is calculated by calculating a difference between the maximum and minimum values according to (Expression 8) below.

$$Gd = Gmax - Gmin \quad \text{(Expression 8)}$$

The purple fringe detection unit 501 compares the G pixel dynamic range Gd with a threshold value ThrG.

$$Gd > ThrG \quad \text{(Expression 9)}$$

When (Expression 9) described above is satisfied, that is, when the G pixel dynamic range Gd is greater than the previously defined threshold value ThrG, initial determination is performed to determine that the central pixel of interest of the reference region is a pixel in which the purple fringe occurs.

This determination is the initial determination. Further, the final determination is performed based on the RGB pixel values of the reference region. This process will be described below.

Conversely, when (Expression 9) described above is not satisfied, that is, when the G pixel dynamic range Gd is equal to or less than the previously defined threshold value ThrG, the central pixel of interest of the reference region is determined not to be the pixel in which the purple fringe occurs and a blend process to be described below is performed by setting a blend rate to 0. That is, the blend process is performed such that a pixel value generated by the corrected value calculation unit 502 is set not reflected on an output pixel value generated by the blend processing unit 503.

The final determination performed after the above-described initial determination will be described.

As described above, for example, in an image with high contrast such as a CZP chart, the value of the W pixel dynamic range Wd increases even in a region in which there is no saturated pixel and no purple fringe occurs. In this case, when the determination processes are performed according to (Expression 8) and (Expression 9) described above, erroneous detection is assumed to be performed since a region is determined to be a purple fringe occurrence region in spite of the fact that this region is not the purple fringe occurrence region.

To prevent such erroneous detection, as shown in FIG. 14(b), RGB pixels are selected from the reference region and are verified, as in the process of calculating the G pixel dynamic range Gd.

That is, it is verified whether there is a saturated pixel in the RGB pixels in the reference region (=an input pixel unit region of 7×7 pixels). The following final determination is performed based on the verification process.

(1) When there is the saturated pixel in the RGB pixels, the final determination is performed to validate the determination according to (Expression 8) and (Expression 9) described above.

(2) When there is no saturated pixel in the RGB pixels, the determination according to (Expression 8) and (Expression 9) described above is invalidated. Therefore, even when the initial determination of determining that the pixel of interest is the pixel in which the purple fringe occurs is performed according to (Expression 8) and (Expression 9) described above, the final determination of determining that the pixel is not the pixel in which the purple fringe occurs is performed.

The corrected value calculation unit 502 performs pixel value correction on the pixel of interest finally determined to be the pixel in which the purple fringe is detected by the purple fringe detection unit 501.

That is, a pixel value obtained by reducing the influence of the purple fringe is calculated as a corrected pixel value of the pixel in which the purple fringe is detected, and then the corrected pixel value is output to the blend processing unit 503.

The corrected value calculation unit 502 does not perform the pixel value correction on the pixel of interest determined not to be the pixel in which the purple fringe is detected by the purple fringe detection unit 501 and outputs the pixel value before the correction without change to the blend processing unit 503.

The corrected value calculation unit 502 calculates the pixel value used to correct the region in which the purple fringe is detected.

First, the corrected value calculation unit 502 calculates a lowpass signal mG of the G pixel by applying convolution calculation of the LPF is to the G pixel of the reference region centering on the pixel of interest which is a pixel to be corrected.

This process is the same as the process described above with reference to FIGS. 8(a) to 8(d) in the first embodiment.

Next, the corrected value calculation unit 502 calculates the corrected pixel value of the pixel of interest, that is, the central pixel of the reference pixel region of the 7×7 pixels by applying the calculated G lowpass signal mG.

The corrected pixel value is calculated according to (Expression 10g), (Expression 10r), and (Expression 10b) below.

(Expression 10g), (Expression 10r), and (Expression 10b) below are selectively applied according to the color of the pixel of interest, that is, the pixel at the position of the central pixel of the reference pixel region of the 7×7 pixels.

(1) When the output pixel is a G pixel, a correction value g' is calculated according to (Expression 10g) below:

$$g' = mG \quad \text{(Expression 10g)}.$$

(2) When the output pixel is an R pixel, a correction value r' is calculated according to (Expression 10r) below:

$$r' = mG/\text{gain}R \quad \text{(Expression 10r)}.$$

(3) When the output pixel is a B pixel, a correction value b' is calculated according to (Expression 10b) below:

$$b' = mG/\text{gain}B \quad \text{(Expression 10b)}.$$

In the above-described expressions, gainR indicates a white balance gain of an R pixel and gainB indicates a white balance gain of a B pixel.

The corrected value calculation unit 502 calculates the corrected pixel values r', g', and b' of the pixels of interest determined to be the purple fringe pixels and outputs the corrected pixel values r', g', and b' to the blend processing unit 503.

The corrected value calculation unit 502 does not calculate the corrected pixel value of the pixel of interest determined not to be the purple fringe pixel and outputs the input pixel value before the correction to the blend processing unit 503 without change.

The blend processing unit 503 calculates final pixel values by performing a blend process (weighted addition) of blending the input pixel values (r, g, and b) output by the image sensor 410 with the output signal of the corrected value calculation unit 502 at the position of each correspondence pixel according to (Expression 11G), (Expression 11R), and (Expression 11B) below and outputs the final pixel values.

(1) When the output pixel is a G pixel, the pixel value g input from the image sensor 410 is set as an output value G without change, as expressed in (Expression 11G) below:

$$G = g \quad \text{(Expression 11G)}.$$

(2) When the output pixel is an R pixel, an output value R is calculated according to (Expression 11R) below:

$$R = (1-\text{rate}) \times r + \text{rate} \times r' \quad \text{(Expression 11R)}.$$

(3) When the output pixel is a B pixel, an output value B is calculated according to (Expression 11B) below:

$$B = (1-\text{rate}) \times b + \text{rate} \times b' \quad \text{(Expression 11B)}.$$

(Expression 11R) and (Expression 11B) described above are calculation expressions used to calculate the output values R and B as the results of the blend process (weighted addition) obtained by assuming that rate is a blend rate (weight) of each pixel value of the pixel values r' and b' obtained after the purple fringe correction and assuming that (1−rate) is each blend rate (weight) of the output pixel values r and b from the image sensor 410.

Since the intensity of a false color is nearly proportional to the G pixel dynamic range Gd in the reference region, a value, rate, obtained by normalizing the G pixel dynamic range Gd to a range of 0 to 1 is set to a blend rate according to (Expression 12) below:

$$\text{rate} = Wd/\text{MAX} \quad \text{(Expression 12)}.$$

Figure 15:
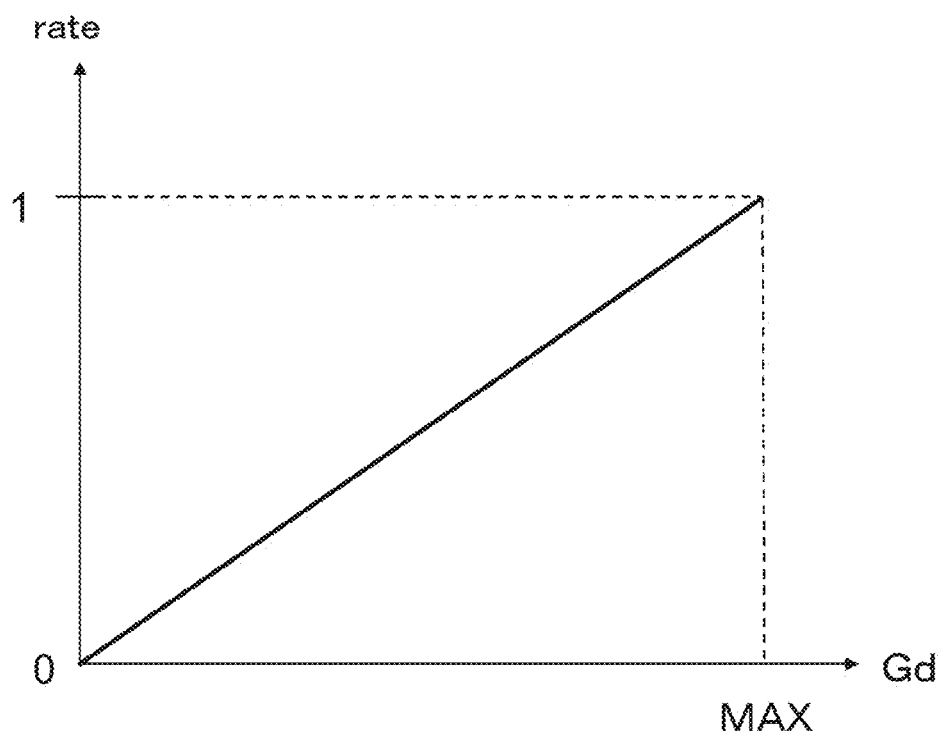
FIG. 15 is a diagram illustrating a setting example of a blend rate rate applied to a blend process performed by the data conversion processing unit of the image processing device according to the embodiment of the present disclosure.

MAX indicates the maximum value of the W pixel dynamic range Gd. That is, the blend process of applying the blend rate (rate) set in FIG. 15 is performed.

Thus, the blend processing unit 503 determines the output pixel values through one of the processes below:

(a) a process of setting the pixel value g of the G pixel input from the image sensor 410 as the output value G without change;

(b1) a process of determining the output pixel values for the pixels in which the purple fringe occurs by blending the pixel values r and b of the image sensor 410 with the pixel values r' and b' generated by the corrected value calculation unit 502 according to the blend rate determined according to the G pixel dynamic range Gd of the reference region; and (b2) a process of setting the pixel values r and b of the image sensor 410 as the output pixel values for the pixels of the R and B pixels in which no purple fringe occurs.

The data correction processing unit 500 reduces the purple fringe, generates the output image having the RGB array, and outputs the output image to the RGB signal processing unit 450.

Figure 16:
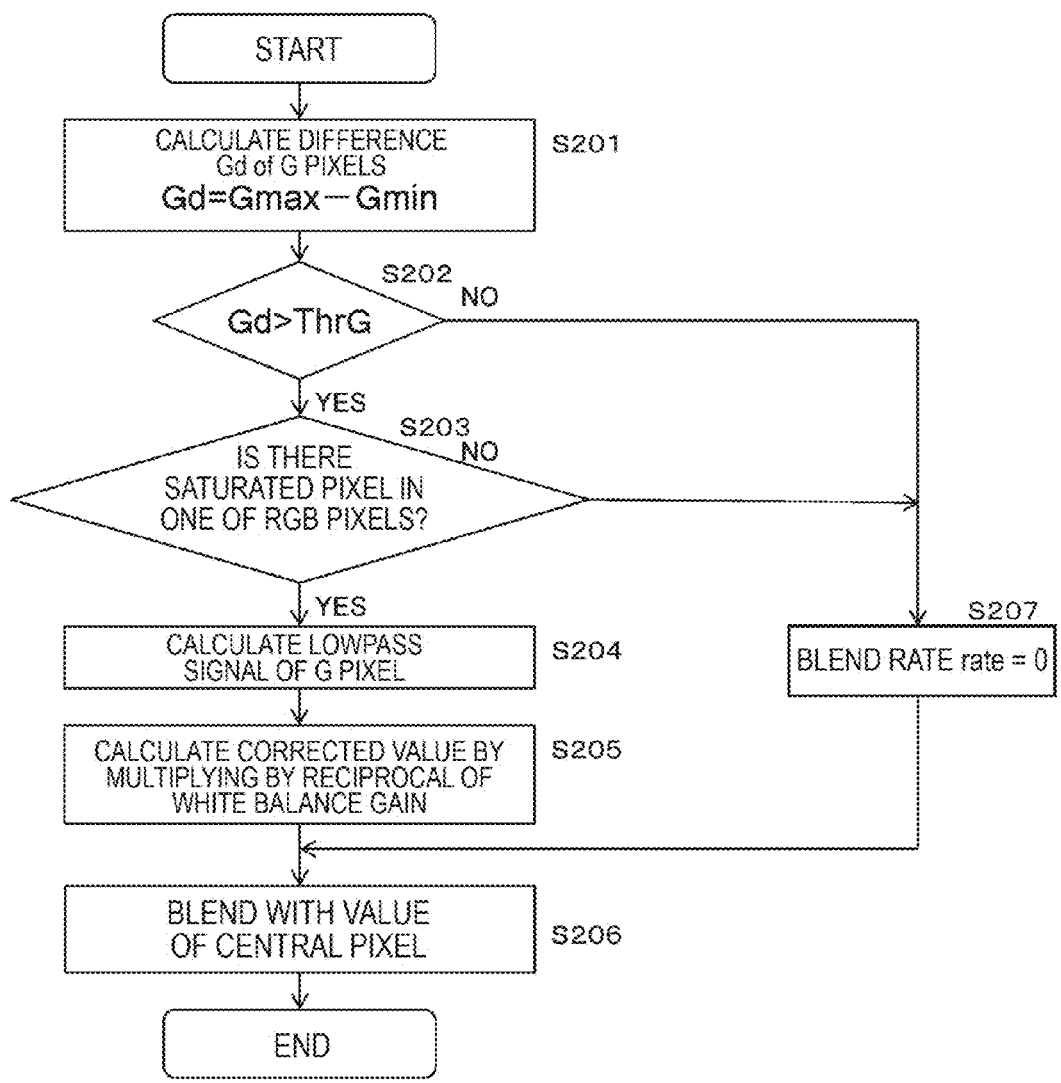
FIG. 16 is a flowchart illustrating a sequence of a process performed by the image processing device according to the embodiment of the present disclosure.

The flowchart of a processing sequence performed by the data correction processing unit 500 is shown in FIG. 16.

FIG. 16 is the flowchart of detection of the purple fringe, the calculation of the correction values, and the blend process performed by the data correction processing unit 500. Hereinafter, the process of each step will be described.

Steps S201, S202, and S203 are processes performed by the purple fringe detection unit 501 of the data correction processing unit 500 shown in FIG. 12.

First, in step S201, a difference between the maximum and minimum values of the G pixels in the input pixel unit region formed from the reference region including the pixel of interest to be corrected, that is, the G pixel dynamic range Gd, is calculated.

In the example described above in the embodiment, the input pixel unit region is the 7×7 pixel region including the pixel of interest to be corrected.

The maximum value (Gmax) and the minimum value (Gmin) of the G pixels included in the 7×7 pixel region are acquired and the G pixel dynamic range Gd is calculated according to the following expression:

$$Gd = G\text{max} - G\text{min}.$$

Next, in step S202, the G pixel dynamic range Gd is compared to the threshold value ThrG to determine whether the G pixel dynamic range Gd is greater than the threshold value ThrG.

That is, Gd>ThrG.

It is determined whether the above-described determination expression is satisfied.

The threshold value ThrG may be a fixed value, may be a value settable by a user, or may automatically be calculated.

As described above with reference to FIGS. 13(a) and 13(b), the case in which the G pixel dynamic range Gd is greater than the threshold value ThrG indicates a region in which the occurrence possibility of the purple fringe is high. Further, the case in which the G pixel dynamic range Gd is not greater than the threshold value ThrG indicates a region in which the occurrence possibility of the purple fringe is low.

When the determination expression is not satisfied, that is, the G pixel dynamic range Gd is not greater than the threshold value ThrG, the process proceeds to step S207.

In step S207, the blend rate rate is set to 0. That is, the blend rate of the output pixel value of the corrected value calculation unit 502 calculating the output pixel value is set to 0 in the blend process of calculating the output pixel value in the blend processing unit 503 of the data correction processing unit 500 shown in FIG. 12.

The blend rate rate is a blend rate set according to (Expression 11R) and (Expression 11B) described above.

That is, when the G pixel dynamic range Gd is not greater than the threshold value ThrG and the region is determined to be the region in which the occurrence possibility of the purple fringe is small, the blend process of step S206 is performed with the blend rate rate=0 set according to (Expression 11R) and (Expression 11B).

As a result, when the G pixel dynamic range Gd is not greater than the threshold value ThrG and the region is determined to be the region in which the occurrence possibility of the purple fringe is low, the data correction processing unit 500 shown in FIG. 12 sets the pixel value input from the image sensor 410 as the output pixel value without change.

Conversely, when a process of comparing the G pixel dynamic range Gd to the threshold value ThrG is performed, that is, when the determination expression of Gd>ThrG is satisfied in step S202, the process proceeds to step S203.

The case in which the determination expression is satisfied is a case in which the region is determined to be a region in the occurrence possibility of the purple fringe is high.

In this case, in step S203, it is examined whether there is a saturated RGB pixel in the input pixel unit region.

In the above-described embodiment, the input pixel unit region is the 7×7 pixel region including the pixel of interest to be corrected.

It is determined whether there is the saturated pixel value in the RGB pixels included in the 7×7 pixel region.

When there is no saturated pixel in the RGB pixels, the process proceeds to step S207 and the blend rate rate is set to 0. That is, in the blend process of calculating the output pixel value in the blend processing unit 503 of the data correction processing unit 500 shown in FIG. 12, the blend rate of the output pixel value of the corrected value calculation unit 502 is set to 0.

The blend rate rate is the blend rate set according to (Expression 11R) and (Expression 11B) described above.

The case in which there is no one saturated pixel in the RGB pixels in the input pixel unit region, that is, the reference region is a case in which the possibility that the region is the purple fringe occurrence region is determined to be low.

In this case, the blend process is performed according to (Expression 11G), (Expression 11R), and (Expression 11B) described above by setting the blend rate of the output pixel value of the corrected value calculation unit 502 to 0, and the pixel value input from the image sensor 410 is set as the output pixel value without change.

Conversely, when there is the saturated RGB pixel in the input pixel unit region in step S203, the process proceeds to step S204.

The processes of steps S204 and S205 are processes performed by the corrected value calculation unit 502 of the data correction processing unit 500 shown in FIG. 12.

In step S204, the lowpass signal of the G pixel is calculated by applying the G pixel value of the reference region which is the input pixel unit region.

This process is a process performed by applying the LPF selected according to the pixel array.

In step S205, a corrected value is calculated by multiplying the lowpass signal of the G pixel by the reciprocal of the white balance gain. Specifically, the corrected value is calculated according to the color of the pixel value obtained after the conversion by applying (Expression 10g), (Expression 10r), and (Expression 10b) described above. That is, the following processes are performed.

(1) When the output pixel is the G pixel, the corrected value g' is calculated according to (Expression 10g) below:

$$g' = mG \quad \text{(Expression 10g)}.$$

(2) When the output pixel is the R pixel, the corrected value r' is calculated by (Expression 10r) below:

$$r' = mG/gainR \quad \text{(Expression 10r)}.$$

(2) When the output pixel is the B pixel, the corrected value b' is calculated according to (Expression 10b) below:

$$b' = mG/gainB \quad \text{(Expression 10b)}.$$

In the above-described expressions, gainR indicates the white balance gain of the R pixel and gainB indicates the white balance gain of the B pixel.

The process of step S206 is a process performed by the blend processing unit 503 of the data correction processing unit 500 shown in FIG. 12.

In step S206, the output signal of the image sensor 410 is blended with the output signal of the corrected value calculation unit 502 according to the blend rate rate.

That is, as described above, the output pixel values are calculated according to the following calculation expressions.

(a) When the output pixel is the G pixel, the calculation expression of the output value G is as follows:

$$G = g \quad \text{(Expression 11G)}.$$

(b) When the output pixel is the R pixel, the calculation expression of the output value R is as follows:

$$R = (1-\text{rate}) \times r + \text{rate} \times r' \quad \text{(Expression 11R)}.$$

(a) When the output pixel is the B pixel, the calculation expression of the output value B is as follows:

$$B = (1-\text{rate}) \times b + \text{rate} \times b' \quad \text{(Expression 11B)}.$$

The output pixel values of the output image having the RGB array 482 shown in FIG. 12 are calculated according to these expressions.

By performing such processes, it is possible to generate the RGB image in which the pixel value error such as a false color caused due to the purple fringe is reduced.

The image that has the RGB array 482 generated by the data correction processing unit 500 shown in FIG. 12 is input to the RGB signal processing unit 450, as shown in FIG. 11.

The RGB signal processing unit 450 performs the same process as a signal processing unit included in a camera or the like according to the related art. Specifically, the color image 483 is generated by performing a de-mosaic process, a white balance adjustment process, a γ correction process, and the like. The generated color image 483 is recorded in the memory 430.

Since the pixel arrays of the input image and the output image of the data correction processing unit 500 are the same RGB array in the configuration of the fourth embodiment, the purple fringe correction is performed without performing the re-mosaic process as the pixel array conversion process, unlike the first embodiment described above, and the corrected RGB array image is output to the RGB signal processing unit 450 of the subsequent stage.

5. Advantages of Processes of Image Processing Device According to Embodiments of the Present Disclosure The image processing devices according to the plurality of embodiments of the present disclosure have been described.

In the image processing devices according to the embodiments of the present disclosure, it is possible to obtain the following advantages.

(a) It is possible to reduce the purple fringe occurring due to a chromatic aberration of a lens of an imaging device.

(b) It is possible to reduce the purple fringe at low cost, compared to a method of reducing the chromatic aberration using an expensive lens.

(c) Since the correction process can be applied to RAW data before de-mosaic, for example, a correction processing unit can embedded into an image sensor.

(d) It is possible to apply the embodiments to an image having an RGBW array including white pixels in a color filter. For example, such advantages can be obtained.

6. Summarization of Configuration According to Embodiments of the Present Disclosure The specific embodiments of the present disclosure have been described in detail. However, it should be apparent to those skilled in the art that the embodiments may be corrected or substituted beyond the scope of the present disclosure without departing from the gist of the present disclosure. That is, since the present disclosure has been described in the exemplified forms, the present disclosure should not be construed as limiting. To determine the gist of the present disclosure, the claims should be referred to.

Additionally, the present technology may also be configured as below.

(1) An image processing device including:
  a data conversion processing unit that receives an input of an RGBW array image and generates an RGB array image as an output image,
    wherein the data conversion processing unit includes
    a pixel interpolation unit that calculates interpolated pixel values r1, g1, and b1 corresponding to an array of the RGB array image by performing a pixel interpolation process on the RGBW array image,
    a purple fringe detection unit that detects whether each pixel is a purple fringe pixel by analyzing the RGBW array image,
    a corrected value calculation unit that calculates corrected pixel values r2, g2, and b2 by correcting pixel values of the purple fringe pixels, and
    a blend processing unit that calculates constituent pixel values RGB of the output image by performing a blend process of blending the interpolated pixel values r1, g1, and b1 calculated by the pixel interpolation unit with the corrected pixel values r2, g2, and b2 calculated by the corrected value calculation unit.

(2) The image processing device according to (1), wherein the purple fringe detection unit
  calculates a W pixel dynamic range Wd from a W pixel value of a reference region which is set in the RGBW array image and includes a pixel of interest which is a calculation target pixel of the constituent pixel value of the output image, and
  performs initial determination of determining that there is a high possibility that the pixel of interest is the purple fringe pixel when the W pixel dynamic range Wd is greater than a threshold value ThrW.

(3) The image processing device according to (2), wherein, when the purple fringe detection unit determines that there is the high possibility that the pixel of interest is the purple fringe pixel in the initial determination, the purple fringe detection unit verifies whether there is a saturated pixel in RGB pixels or RGBW pixels in the reference region and performs final determination of determining that the pixel of interest is the purple fringe pixel when there is the saturated pixel.

(4) The image processing device according to any one of (1) to (3), wherein the corrected value calculation unit
  calculates a lowpass signal of a luminance signal main component from a pixel value of a color pixel serving as the luminance signal main component of a reference region which is set within the RGBW array image and includes a pixel of interest which is a calculation target pixel of a constituent pixel value of the output image, and
  calculates the corrected pixel value by performing white balance adjustment on the calculated lowpass signal of the luminance signal main component according to a color after a conversion target pixel of the pixel of interest.

(5) The image processing device according to (4), wherein the color pixel serving as the luminance signal main component is a W pixel or a G pixel.

(6) The image processing device according to any one of (1) to (5), wherein the blend processing unit calculates a blend rate according to a W pixel dynamic range Wd calculated from a W pixel value of a reference region which is set within the RGBW array image and includes a pixel of interest which is a calculation target pixel of a constituent pixel value of the output image, and performs the blend process according to the calculated blend rate.

(7) The image processing device according to any one of (1) to (6), wherein, as a W pixel dynamic range Wd of the reference region is larger, the blend processing unit performs the blend process by setting a contribution ratio of the corrected pixel values r2, g2, and b2 calculated by the corrected value calculation unit to be larger than a contribution ratio of the interpolated pixel values r1, g1, and b1 calculated by the pixel interpolation unit, and calculates the constituent pixel values RGB of the output image.

(8) The image processing device according to any one of (1) to (7), wherein the blend processing unit calculates a blend rate rate of the corrected pixel values r2, g2, and b2 calculated by the corrected value calculation unit by applying a W pixel dynamic range Wd of the reference region and a maximum value MAX of the W pixel dynamic range Wd according to the following expression:

$$\text{rate} = Wd/\text{MAX}.$$

(9) The image processing device according to any one of (1) to (8), wherein the blend processing unit performs the blend process on the pixel determined to be the purple fringe by the purple fringe detection unit by setting a blend rate rate of the corrected pixel values r2, g2, and b2 calculated by the corrected value calculation unit to 1.0 and outputs the corrected pixel values r2, g2, and b2 as the constituent pixel values RGB of the output image.

(10) An image processing device including:
  a data correction processing unit that receives an input of an RGB array image as an input image and generates a corrected image by performing a pixel value correction process,
    wherein the data correction processing unit includes
    a purple fringe detection unit that analyzes the input image to detect whether each pixel is a purple fringe pixel,
    a corrected value calculation unit that calculates corrected pixel values r2, g2, and b2 by performing pixel value correction on the purple fringe pixel, and
    a blend processing unit that calculates constituent pixel values RGB of the corrected image by performing a blend process of blending pixel values r1, g1, and b1 of the input image with the corrected pixel values r2, g2, and b2 calculated by the corrected value calculation unit.

(11) The image processing device according to (10), wherein the purple fringe detection unit
  calculates a G pixel dynamic range Gd from a G pixel value of a reference region which is set within the input image and includes a pixel of interest which is a calculation target pixel of the constituent pixel value of the corrected image, and
  performs initial determination of determining that there is a high possibility that the pixel of interest is the purple fringe pixel when the G pixel dynamic range Gd is greater than a threshold value ThrG.

(12) The image processing device according to (11), wherein, when the purple fringe detection unit determines that there is the high possibility that the pixel of interest is the purple fringe pixel in the initial determination, the purple fringe detection unit verifies whether there is a saturated pixel in RGB pixels in the reference region and performs final determination of determining that the pixel of interest is the purple fringe pixel when there is the saturated pixel.

(13) The image processing device according to any one of (10) to (12), wherein the corrected value calculation unit calculates a G lowpass signal from a pixel value of the G pixel of a reference region which is set within the input image and includes a pixel of interest which is a calculation target pixel of a constituent pixel value of the corrected image, and calculates the corrected pixel value by performing white balance adjustment on the calculated G lowpass signal according to a color after a conversion target pixel of the pixel of interest.

(14) The image processing device according to any one of (10) to (13), wherein the blend processing unit calculates a blend rate according to a G pixel dynamic range Gd calculated from a G pixel value of a reference region which is set within the input image and includes a pixel of interest which is a calculation target pixel of a constituent pixel value of the corrected image, and performs the blend process according to the calculated blend rate.

(15) The image processing device according to any one of (10) to (14), wherein, as a G pixel dynamic range Gd of the reference region is larger, the blend processing unit performs the blend process by setting a contribution ratio of the corrected pixel values r2, g2, and b2 calculated by the corrected value calculation unit to be larger than a contribution ratio of the pixel values r1, g1, and b1 of the input image, and calculates the constituent pixel values RGB of the corrected image.

(16) The image processing device according to any one of (10) to (15), wherein the blend processing unit calculates a blend rate rate of the corrected pixel values r2, g2, and b2 calculated by the corrected value calculation unit by applying a G pixel dynamic range Gd of the reference region and a maximum value MAX of the G pixel dynamic range Gd according to the following expression:

rate=$Gd$/MAX.

Further, a method of a process executed in the aforementioned apparatus or system, a program for executing a process, and a recording medium having the program recorded thereon are all included in the configuration according to an embodiment of the present disclosure.

Furthermore, the processing sequence that is explained in the specification can be implemented by hardware, by software and by a configuration that combines hardware and software. In a case where the processing is implemented by software, it is possible to install in memory within a computer that is incorporated into dedicated hardware a program in which the processing sequence is encoded and to execute the program. It is also possible to install a program in a general-purpose computer that is capable of performing various types of processing and to execute the program. For example, the program can be installed in advance in a storage medium. In addition to being installed in a computer from the storage medium, the program can also be received through a network, such as a local area network (LAN) or the Internet, and can be installed in a storage medium such as a hard disk or the like that is built into the computer.

Note that the various types of processing that are described in this specification may not only be performed in a temporal sequence as has been described, but may also be performed in parallel or individually, in accordance with the processing capacity of the device that performs the processing or as necessary. Furthermore, the system in this specification is not limited to being a configuration that logically aggregates a plurality of devices, all of which are contained within the same housing.

As described above, according to an embodiment of the present disclosure, a device and a method for correcting purple fringe for a mosaic image output from an image sensor are realized.

Specifically, for example, there are provided a pixel interpolation unit that calculates interpolated pixel values of an RGB array image by performing a pixel interpolation process on an RGBW array image, a purple fringe detection unit that detects a purple fringe pixel from the RGBW array image, a corrected value calculation unit that calculates corrected pixel values by correcting pixel values of the purple fringe pixel, and a blend processing unit that calculates constituent pixel values RGB of an output image by blending the interpolated pixel values calculated by the pixel interpolation unit with the corrected pixel values calculated by the corrected value calculation unit. The purple fringe detection unit determines that a pixel of interest is the purple fringe pixel when a W pixel dynamic range of a reference region is greater than a previously defined threshold value and there is a saturated RGB pixel or a saturated RGBW pixel in the reference region.

By performing such processes, it is possible to realize detection of the purple fringe pixel with high accuracy for a mosaic image output from an image sensor and generation of a high-quality image in which the influence of the purple fringe is reduced.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2012-090748 filed in the Japan Patent Office on Apr. 12, 2012, the entire content of which is hereby incorporated by reference.

What is claimed is:

1. An image processing method performed by an image processing device, the method comprising:

performing a data conversion process of receiving an input of an RGBW (Red Green Blue White) array image and generating an RGB (Red Green Blue) array image as an output image, wherein the data conversion process includes:

calculating interpolated pixel values r1, g1, and b1 corresponding to an array of the RGB array image by performing a pixel interpolation process on the RGBW array image;

detecting whether each pixel is a purple fringe pixel by analyzing the RGBW array image;

calculating corrected pixel values r2, g2, and b2 by correcting pixel values of the purple fringe pixels; and calculating constituent pixel values RGB of the output image by performing a blend process of blending the interpolated pixel values r1, g1, and b1 calculated in the process of calculating interpolated pixel values with the corrected pixel values r2, g2, and b2 calculated in the process of calculating the corrected values.

2. The image processing method according to claim 1, wherein the process of detecting the purple fringe includes:

calculating a W pixel dynamic range Wd from a W pixel value of a reference region which is set in the RGBW array image and includes a pixel of interest which is a calculation target pixel of the constituent pixel value of the output image, and performing initial determination of determining that there is a high possibility that the pixel of interest is the purple fringe pixel when the W pixel dynamic range Wd is greater than a threshold value ThrW.

3. A non-transitory computer readable medium having stored thereon, a set of computer-executable instructions for causing the computer to perform steps comprising:
   calculating interpolated pixel values r1, g1, and b1 corresponding to an array of an RGB (Red Green Blue) array image by performing a pixel interpolation process on an RGBW (Red Green Blue White) array image;
   detecting whether each pixel is a purple fringe pixel by analyzing the RGBW array image,
   calculating corrected pixel values r2, g2, and b2 by correcting pixel values of the purple fringe pixels, and
   calculating constituent pixel values RGB of the RGB array image as an output image by performing a blend process of blending the interpolated pixel values r1, g1, and b1 calculated in the process of calculating interpolated pixel values with the corrected pixel values r2, g2, and b2 calculated in the process of calculating the corrected values.

4. The non-transitory computer readable medium according to claim 3, wherein the set of computer-executable instructions cause the computer to perform steps comprising:
   calculating a W pixel dynamic range Wd from a W pixel value of a reference region which is set in the RGBW array image and includes a pixel of interest which is a calculation target pixel of the constituent pixel value of the output image, and
   performing initial determination of determining that the pixel of interest is the purple fringe pixel when the W pixel dynamic range Wd is greater than a threshold value ThrW.

5. An image processing device comprising:
   one or more processors;
   a non-transitory, computer readable memory stored therein computer-executable instructions that when executable by said one or more processors perform the following:
   receive an input of an RGBW (Red Green Blue White) array image and generate an RGB (Red Green Blue) array image as an output image;
   calculate interpolated pixel values r1, g1, and b1 corresponding to an array of the RGB array image by performing a pixel interpolation process on the RGBW array image;
   detect whether each pixel is a purple fringe pixel by analyzing the RGBW array image;
   calculate corrected pixel values r2, g2, and b2 by correcting pixel values of the purple fringe pixels; and
   calculate constituent pixel values RGB of the output image by performing a blend process of blending the interpolated pixel values r1, g1, and b1 calculated by the pixel interpolation unit with the corrected pixel values r2, g2, and b2.

6. The image processing device according to claim 5, further includes computer-executable instructions to perform the following:
   calculate a W pixel dynamic range Wd from a W pixel value of a reference region which is set in the RGBW array image and includes a pixel of interest which is a calculation target pixel of the constituent pixel value of the output image, and
   perform initial determination of determining that the pixel of interest is the purple fringe pixel when the W pixel dynamic range Wd is greater than a threshold value ThrW.

7. The image processing device according to claim 6, further includes computer-executable instructions to perform the following:
   determine that the pixel of interest is the purple fringe pixel in the initial determination,
   verify whether there is a saturated pixel in RGB pixels or RGBW pixels in the reference region, and
   perform final determination of determining that the pixel of interest is the purple fringe pixel when there is the saturated pixel.

8. The image processing device according to claim 5, further includes computer-executable instructions to perform the following:
   calculate a lowpass signal of a luminance signal main component from a pixel value of a color pixel serving as the luminance signal main component of a reference region which is set within the RGBW array image and includes a pixel of interest which is a calculation target pixel of a constituent pixel value of the output image, and
   calculate the corrected pixel value by performing white balance adjustment on the calculated lowpass signal of the luminance signal main component according to a color after a conversion target pixel of the pixel of interest.

9. The image processing device according to claim 8, wherein the color pixel serving as the luminance signal main component is a W pixel or a G pixel.

10. The image processing device according to claim 5, further includes computer-executable instructions to perform the following:
    calculate a blend rate according to a W pixel dynamic range Wd calculated from a W pixel value of a reference region which is set within the RGBW array image and includes a pixel of interest which is a calculation target pixel of a constituent pixel value of the output image, and
    perform the blend process according to the calculated blend rate.

11. The image processing device according to claim 5, further includes computer-executable instructions to:
    perform the blend process by setting a contribution ratio of the corrected pixel values r2, g2, and b2 calculated by the corrected value calculation unit to be larger than a contribution ratio of the interpolated pixel values r1, g1, and b1 calculated by the pixel interpolation unit; and
    calculate the constituent pixel values RGB of the output image,
    when the W pixel dynamic range Wd of the reference region is larger than a threshold value ThrW.

12. The image processing device according to claim 5, further includes computer-executable instructions to calculate a blend rate rate of the corrected pixel values r2, g2, and b2 by applying a W pixel dynamic range Wd of the reference region and a maximum value MAX of the W pixel dynamic range Wd according to the following expression: rate=Wd/MAX.

13. The image processing device according to claim 5, further includes computer-executable instructions to perform the following:
    perform the blend process on the pixel determined to be the purple fringe by setting a blend rate rate of the corrected pixel values r2, g2, and b2 to 1.0, and output the corrected pixel values r2, g2, and b2 as the constituent pixel values RGB of the output image.

14. An image processing device comprising:
one or more processors;
    a non-transitory, computer readable memory stored therein computer-executable instructions that when executable by said one or more processors perform the following:
    receive an input of an RGB (Red Green Blue) array image as an input image and generate a corrected image by performing a pixel value correction process;
    analyze the input image to detect whether each pixel is a purple fringe pixel;
    calculate corrected pixel values r2, g2, and b2 by performing pixel value correction on the purple fringe pixel,
    calculate constituent pixel values RGB of the corrected image by performing a blend process of blending pixel values r1, g1, and b1 of the input image with the corrected pixel values r2, g2, and b2;
    calculate a blend rate according to a G pixel dynamic range Gd calculated from a G pixel value of a reference region which is set within the input image and includes a pixel of interest which is a calculation target pixel of a constituent pixel value of the corrected image; and
    perform the blend process according to the calculated blend rate.

15. The image processing device according to claim 14, further includes computer-executable instructions to make initial determination of determining that there is a high possibility that the pixel of interest is the purple fringe pixel when the G pixel dynamic range Gd is greater than a threshold value ThrG.

16. The image processing device according to claim 15, further includes computer-executable instructions to:
    determine that the pixel of interest is determined to be the purple fringe pixel in the initial determination;
    verify whether there is a saturated pixel in RGB pixels in the reference region and make final determination of determining that the pixel of interest is the purple fringe pixel when there is the saturated pixel.

17. The image processing device according to claim 14, further includes computer-executable instructions to:
    calculate a G lowpass signal from a pixel value of the G pixel of said reference region, and
    calculate the corrected pixel value by performing white balance adjustment on the calculated G lowpass signal according to a color after a conversion target pixel of the pixel of interest.

18. The image processing device according to claim 14, further includes computer-executable instructions to:
    perform the blend process by setting a contribution ratio of the corrected pixel values r2, g2, and b2 to be larger than a contribution ratio of the pixel values r1, g1, and b1 of the input image, and
    calculate the constituent pixel values RGB of the corrected image;
    when said G pixel dynamic range Gd of the reference region is larger than a B pixel dynamic range or an R pixel dynamic range.

19. The image processing device according to claim 14, further includes computer-executable instructions to calculate a blend rate rate of the corrected pixel values r2, g2, and b2 by applying a G pixel dynamic range Gd of the reference region and a maximum value MAX of the G pixel dynamic range Gd according to the following expression: rate=Gd/MAX.

* * * * *